United States Patent
Fujishiro et al.

(10) Patent No.: US 9,936,515 B2
(45) Date of Patent: Apr. 3, 2018

(54) COMMUNICATION CONTROL METHOD

(71) Applicant: KYOCERA CORPORATION, Kyoto (JP)

(72) Inventors: Masato Fujishiro, Yokohama (JP); Yushi Nagasaka, Yokohama (JP); Chiharu Yamazaki, Tokyo (JP); Kugo Morita, Yokohama (JP); Fangwei Tong, Machida (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/089,900

(22) Filed: Apr. 4, 2016

(65) Prior Publication Data
US 2016/0219603 A1 Jul. 28, 2016

Related U.S. Application Data

(63) Continuation of application No. PCT/JP2015/052591, filed on Jan. 29, 2015.
(Continued)

(30) Foreign Application Priority Data

Jan. 31, 2014 (JP) .................................. 2014-017980

(51) Int. Cl.
*H04W 72/08* (2009.01)
*H04W 76/02* (2009.01)
(Continued)

(52) U.S. Cl.
CPC ......... *H04W 72/085* (2013.01); *H04W 24/10* (2013.01); *H04W 72/0413* (2013.01); *H04W 76/025* (2013.01); *H04W 92/20* (2013.01)

(58) Field of Classification Search
CPC ............... H04W 24/04; H04W 72/085; H04W 72/0413
See application file for complete search history.

(56) References Cited

U.S. PATENT DOCUMENTS

| 2013/0157665 A1 | 7/2013 | Toda et al. |
| 2015/0092750 A1* | 4/2015 | Huang ................. H04W 36/08 370/331 |

(Continued)

FOREIGN PATENT DOCUMENTS

| WO | 2012/105167 A1 | 8/2012 |
| WO | 2013/097672 A1 | 7/2013 |
| WO | 2015/116877 A1 | 8/2015 |

OTHER PUBLICATIONS

3GPP TSG-RAN WG2 Meeting 83 bis.*
(Continued)

*Primary Examiner* — Andrew Chriss
*Assistant Examiner* — Voster Preval
(74) *Attorney, Agent, or Firm* — Studebaker & Brackett PC

(57) ABSTRACT

A communication control method pertaining to an embodiment of the present invention is for controlling dual connectivity communication which uses a master base station that establishes RRC connection with a user terminal and a secondary base station that provides a supplementary wireless resource to the user terminal. The communication control method comprises: a step in which the master base station receives, from the user terminal, a measurement report which includes measurement results found for each cell in the user terminal; and a step in which the secondary base station receives, from the master base station, a supplementary request for requesting the allocation of resources to the user terminal. In the step for receiving a supplementary request, the master base station includes, in the supplemen- (Continued)

tary request, measurement results for a cell of the secondary base station which is included in the measurement results, and transmits the same.

9 Claims, 15 Drawing Sheets

Related U.S. Application Data

(60) Provisional application No. 62/034,678, filed on Aug. 7, 2014.

(51) Int. Cl.
  *H04W 24/10* (2009.01)
  *H04W 72/04* (2009.01)
  *H04W 92/20* (2009.01)

(56) References Cited

U.S. PATENT DOCUMENTS

| | | | |
|---|---|---|---|
| 2015/0117183 A1* | 4/2015 | Heo | H04W 36/0055 370/228 |
| 2015/0133122 A1* | 5/2015 | Chen | H04W 76/025 455/436 |
| 2015/0173120 A1* | 6/2015 | Yamada | H04W 36/0072 370/331 |
| 2015/0181593 A1* | 6/2015 | Kim | H04W 52/0216 370/329 |
| 2015/0223270 A1* | 8/2015 | Kim | H04W 74/0833 370/329 |
| 2015/0319801 A1* | 11/2015 | Lee | H04W 56/00 370/329 |
| 2016/0057802 A1* | 2/2016 | Lee | H04W 76/028 370/329 |
| 2016/0095004 A1* | 3/2016 | Tseng | H04W 48/00 370/228 |
| 2016/0381551 A1 | 12/2016 | Zhang | |

OTHER PUBLICATIONS

3 GPP TSG-RAN WG2 meeting 83bis.*
3 GPP TSG-RAN WG2 meeting 83bis hereinafter 3GPP.*
International Search Report issued in PCT/JP2015/052591; dated Mar. 24, 2015.
Written Opinion issued in PCT/JP2015/052591; dated Mar. 24, 2015.
3rd Generation Partnership Project; Technical Specification Group Radio Access Network; Study on Small Cell enhancements for E-UTRA and E-UTRAN; Higher layer aspects; 3GPP TR 36.842 V12.0.0; Dec., 2013; pp. 1-71; Release 12; 3GPP Organizational Partners.
Nokia Corporation, NSN; Discussion on detailed C-plane procedures; 3GPP TSG-RAN WG2 Meeting #83bis; R2-133341; Oct. 7-11, 2013; pp. 1-4; Ljubljana, Slovenia.
Huawei; Xn functions overview; 3GPP TSG-RAN WG3 Meeting #81bis; R3-131654; Oct. 7-11, 2013; pp. 1-4; Venice, Italia.
Presentation of Specification to TSG; TSG RAN Meeting #62; TR 36.842, Version 1.0.0; 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects; 3GPP TR 36.842 V1.0.0; Nov. 2013; pp. 1-69; Release 12; 3GPP Organizational Partners.
CATT; SCG Handover; 3GPP TSG RAN WG2 Meeting #85; R2-140188; Feb. 10-14, 2014; Prague, Czech Republic.
Supplementary Partial European Search Report issued by the European Patent Office dated Sep. 26, 2017, which corresponds to EP15742558.8-1857 and is related to U.S. Appl. No. 15/089,900.
China Mobile; "Signalling Flow Aspects for SeNB's Serving Cell Addition, Modification and Release"; 3GPP TSG-RAN WG2 Meeting #84; R2-134141; Nov. 11-15, 2013; pp. 1-5; San Francisco, USA.
Ericsson; "Way forward on SCell addition and release"; 3GPP TSG-RAN WG2 #85bis; R2-141828; Mar. 31-Apr. 1, 2014; pp. 1; Valencia, Spain.
KDDI Corporation; "Discussions on reporting SCG-RLF towards MeNB"; 3GPP TSG RAN WG2 Meeting #85bis; R2-141200; Mar. 31-Apr. 4, 2014; total 2 pages; Valencia, Spain.
NSN et al.; "SeNB Failure Reporting"; 3GPP TSG-RAN WG2 Meeting #86; R2-142310; May 19-23, 2014; total 8 pages; Seoul, Korea.
The extended European search report issued by the European Patent Office dated Jan. 5, 2018, which corresponds to European Patent Application No. 15742558.8-1857 and is related to U.S. Appl. No. 15/089,900.

* cited by examiner

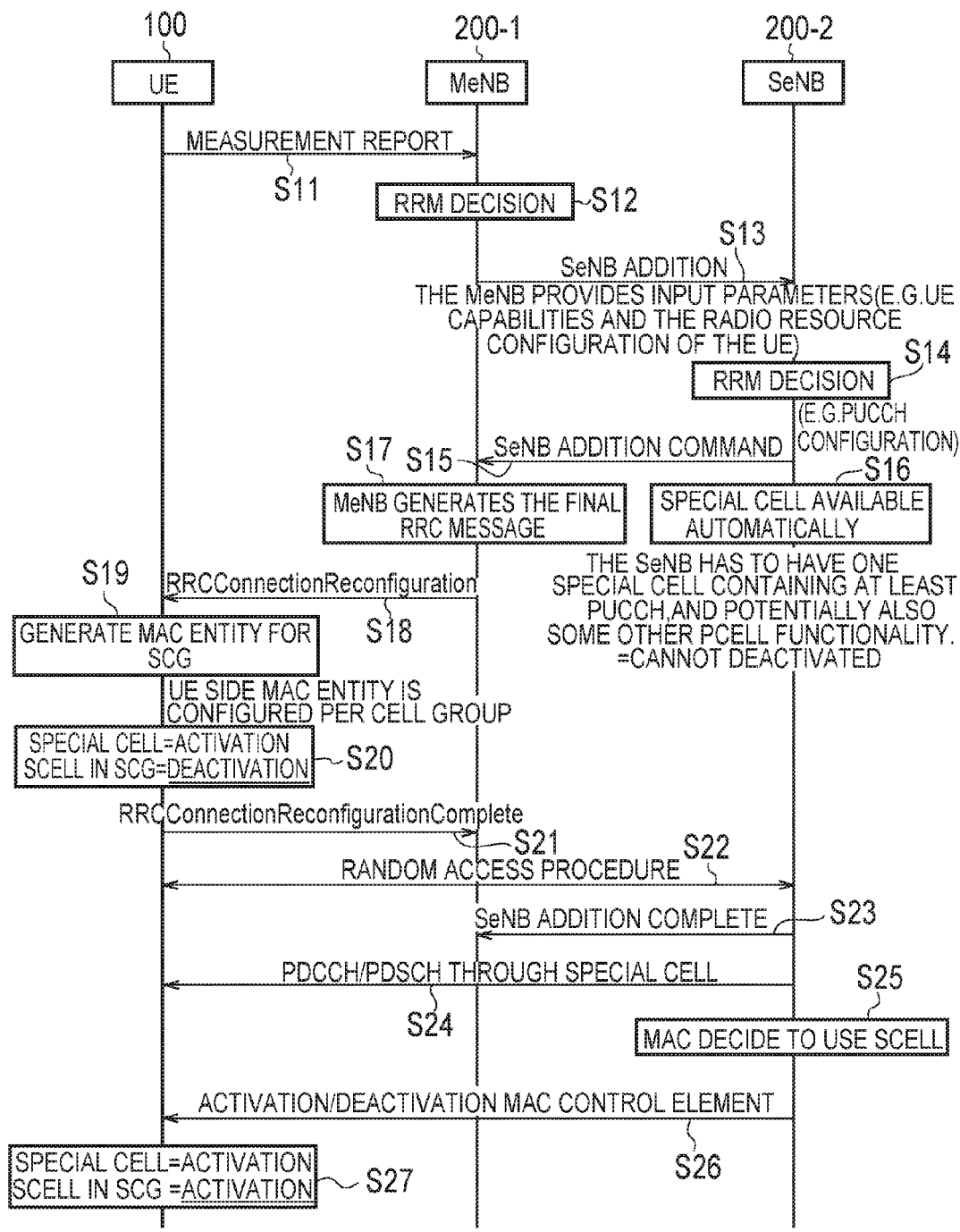

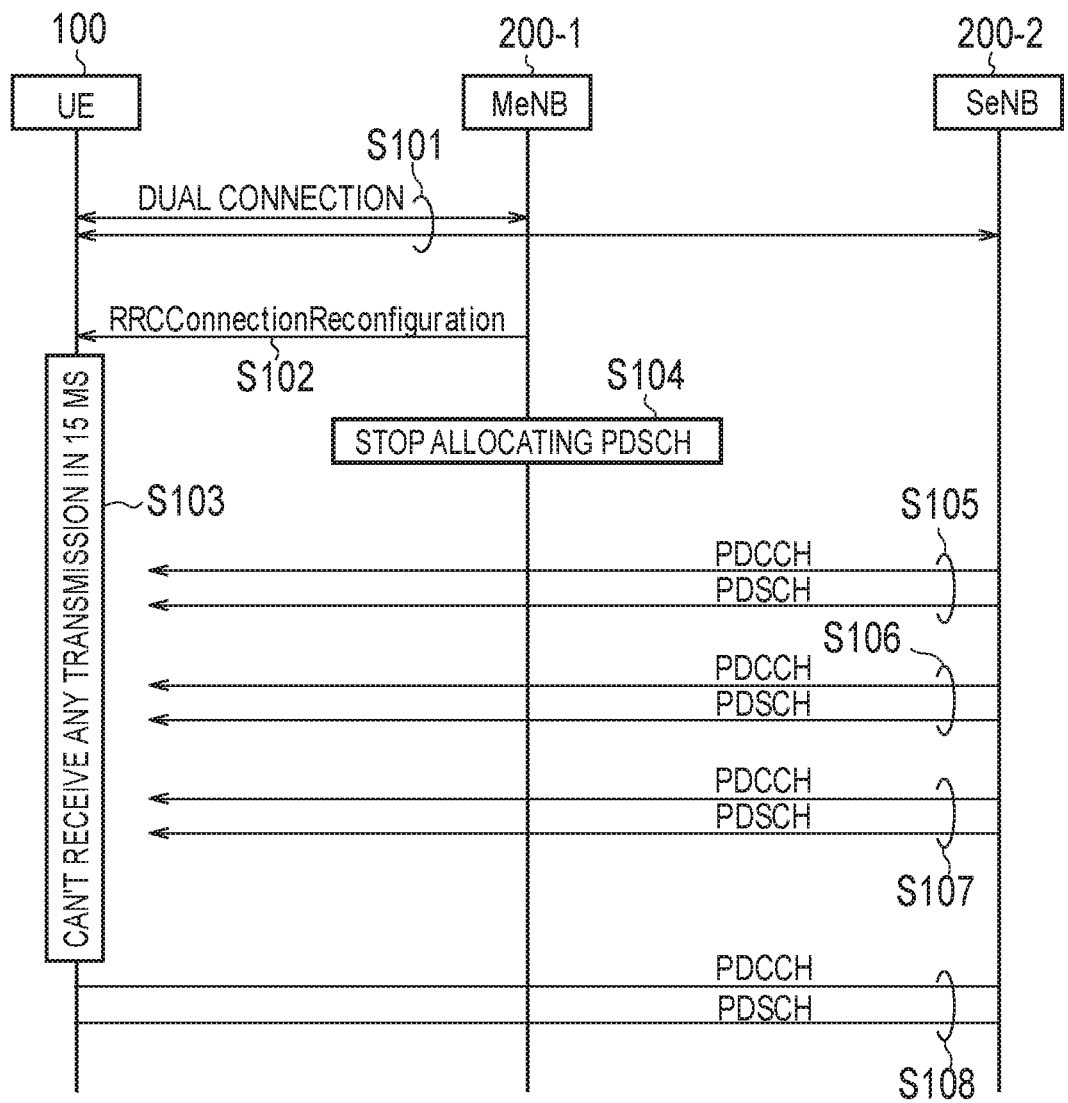

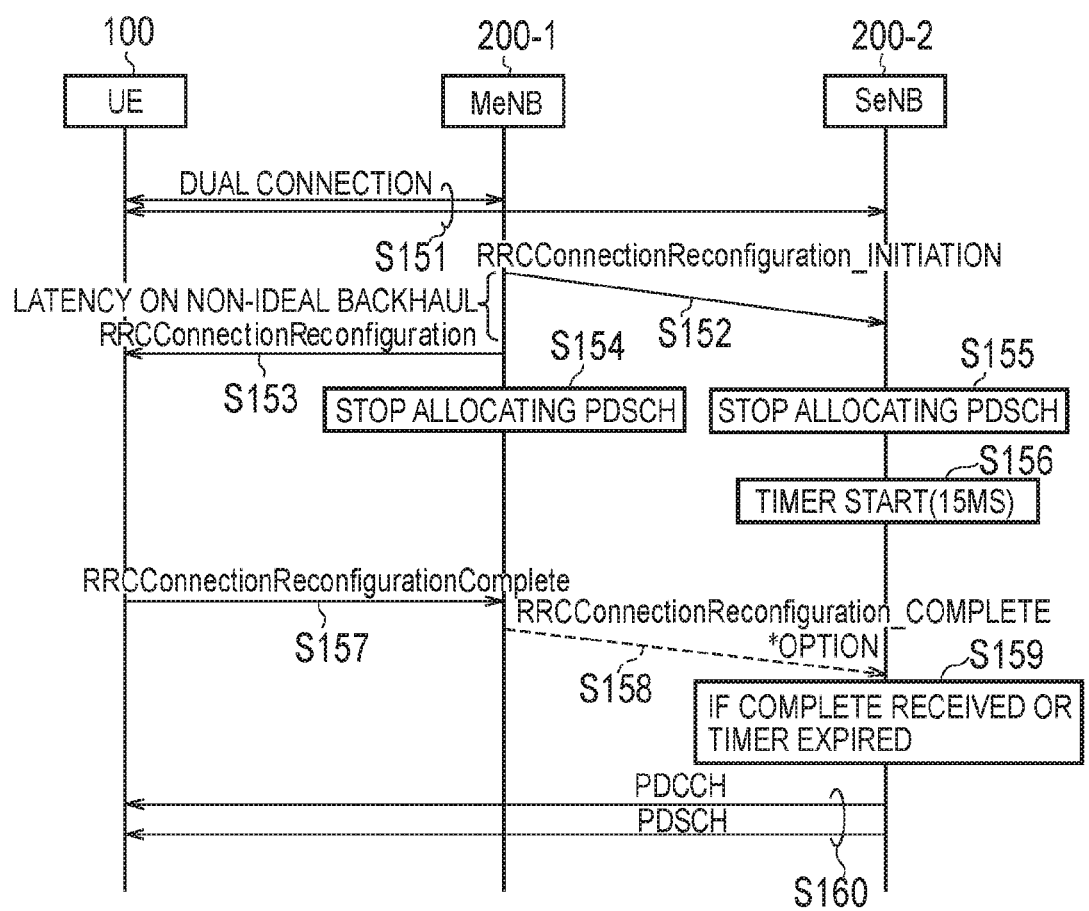

COMMUNICATION CONTROL METHOD

TECHNICAL FIELD

The present invention relates to a communication control method used in a mobile communication system.

BACKGROUND ART

In 3GPP (3rd Generation Partnership Project), which is a project aiming to standardize a mobile communication system, introduction of a dual connectivity method (Dual connectivity) in Release 12 and thereafter is expected (see Non Patent Document 1). In the dual connectivity method, a user terminal simultaneously establishes a connection with a plurality of base stations. Because a radio resource is assigned to the user terminal from each base station, it is possible to expect an improvement in throughput.

In the dual connectivity method, of the plurality of base stations that establish a connection with the user terminal, only one base station (hereinafter, called "master base station") establishes an RRC connection with the user terminal. On the other hand, of the plurality of base stations, another base station (hereinafter, called "secondary base station") provides an additional radio resource to the user terminal without establishing an RRC connection with the user terminal. It is noted that the dual connectivity method may also be called an inter-base station carrier aggregation (inter-eNB CA).

CITATION LIST

Non-Patent Literature

Non Patent Literature 1: 3GPP technical report "TR 36. 842 V12.0.0" Jan. 7, 2014

SUMMARY OF INVENTION

In order to appropriately perform communication by the dual connectivity method, it is believed that an association between base stations needs to be strengthened.

Thus, an object of the present invention is to provide a communication control method that enables appropriately performing communication by the dual connectivity method.

A communication control method according to a first feature is a method for controlling communication by dual connectivity method using a master base station that establishes an RRC connection with a user terminal and a secondary base station that provides an additional radio resource to the user terminal. The communication control method includes a step that the master base station receives a measurement report from the user terminal, the measurement report including measurement result for each cell obtained by the user terminal, and a step that the secondary base station receives an addition request from the master base station, the addition request being a request of a resource assignment for the user terminal. In the step of receiving the addition request, the master base station transmits the addition request while including a measurement result into the addition request, said measurement result corresponding to each cell of the secondary base station included in the measurement rep ort.

A communication control method according to a second feature is a method for controlling communication by dual connectivity method using a master base station that establishes an RRC connection with a user terminal and a secondary base station that provides an additional radio resource to the user terminal, The communication control method includes a step of transmitting an RRC reconfiguration message from the master base station to the user terminal, the RRC reconfiguration message is a message for performing an RRC reconfiguration of the user terminal; and a step of transmitting an RRC reconfiguration notification from the master base station to the secondary base station, the RRC reconfiguration notification notified in relationship with the RRC reconfiguration message.

A communication control method according to a third feature is a method for controlling communication by dual connectivity method using a master base station that establishes an RRC connection with a user terminal and a secondary base station that provides an additional radio resource to the user terminal. The communication control method includes a step that the master base station receives a measurement report from the user terminal, the measurement report including a measurement result obtained for each cell by the user terminal; and a step of selecting a special cell from among a plurality of cells managed by the secondary base station based on the measurement report, the special cell being a cell provided with a Physical Uplink Control Channel of the user terminal.

A communication control method according to a fourth feature includes a step of transmitting cell information from a first base station to a second base station, the cell information indicating whether or not at least one cell managed by the first base station has a capability of operating as a special cell provided with a Physical Uplink Control Channel of the user terminal.

A communication control method according to a fifth feature is a method for a user terminal provided in a mobile communication system supporting a dual connectivity method, the user terminal that establishes an RRC connection with a master base station and that is provided an additional radio resource from a secondary base station. A secondary cell group is managed by the secondary base station, the secondary cell group including a special cell that a Physical Uplink Control Channel of the user terminal is set. The communication control method includes a step of detecting a radio link failure in the special cell; and a step of transmitting a measurement result to the master base station upon the detection of the radio link failure in the special cell, said measurement result corresponding to the cell included in the secondary cell group.

A communication control method according to sixth feature is a method for a master base station that performs communication by dual connectivity method with a secondary base station that provides an additional radio resource to a user terminal, and that establishes an RRC connection with the user terminal. A secondary cell group is managed by the secondary base station, the secondary cell group including a special cell that a Physical Uplink Control Channel of the user terminal is set. The communication control method includes a step of receiving a failure notification from the user terminal, the failure notification that notifies a radio link failure in the special cell and includes a first measurement result corresponding to a cell other than the special cell included in the secondary cell group, and a step of transmitting a replacement request to the secondary base station, the replacement request being a request for a replacement of the special cell. In the step of transmitting, the master base station transmits the replacement request while including the first measurement result into the replacement request.

A communication control method according to a seventh feature is a method for a secondary base station that performs communication by dual connectivity method with the master base station that establishes an RRC connection with a user terminal, and that provides an additional radio resource to the user terminal. A secondary cell group is managed by the secondary base station, the secondary cell group including a special cell that a Physical Uplink Control Channel of the user terminal is set. The communication control method includes: a step of receiving a replacement request with a first measurement result from the master base station, the replacement request being a request for a replacement of the special cell, the first measurement result corresponding to a cell other than the special cell included in the secondary cell group; a step of making a determination whether or not to replace the special cell with the other cell based on the first measurement result; and a step of notifying a result of the determination to the master base station.

BRIEF DESCRIPTION OF DRAWINGS

FIG. 8 is a sequence diagram showing an operation of starting a dual connectivity method.
FIG. 9 is a sequence diagram showing an operation when MeNB 200-1 performs an RRC reconfiguration for UE 100 with respect to UE 100.
FIG. 10 is a sequence diagram showing an operation sequence according to the first embodiment.

DESCRIPTION OF EMBODIMENTS

Figure 1:
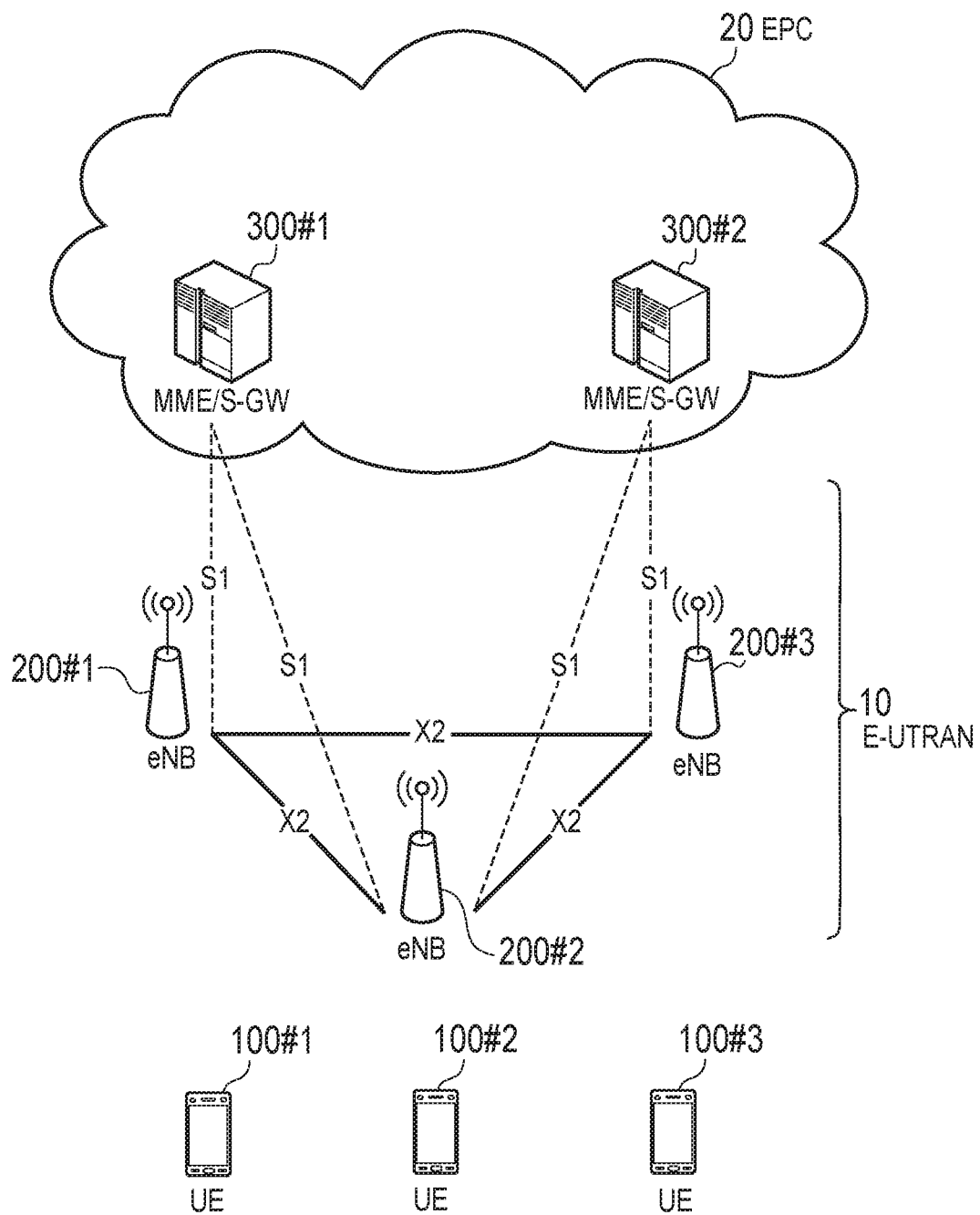
FIG. 1 is a configuration diagram of an LTE system according to a first embodiment to a third embodiment.

[Overview of Embodiment]
A communication control method according to a second embodiment is a method for controlling communication by dual connectivity method using a master base station that establishes an RRC connection with a user terminal and a secondary base station that provides an additional radio resource to the user terminal. The communication control method includes a step that the master base station receives a measurement report from the user terminal, the measurement report including measurement result for each cell obtained by the user terminal, and a step that the secondary base station receives an addition request from the master base station, the addition request being a request of a resource assignment for the user terminal. In the step of receiving the addition request, the master base station transmits the addition request while including a measurement result into the addition request, said measurement result corresponding to each cell of the secondary base station included in the measurement report.

A communication control method according to a first embodiment is a method for controlling communication by dual connectivity method using a master base station that establishes an RRC connection with a user terminal and a secondary base station that provides an additional radio resource to the user terminal, The communication control method includes a step of transmitting an RRC reconfiguration message from the master base station to the user terminal, the RRC reconfiguration message is a message for performing an RRC reconfiguration of the user terminal; and a step of transmitting an RRC reconfiguration notification from the master base station to the secondary base station, the RRC reconfiguration notification notified in relationship with the RRC reconfiguration message.

In the first embodiment, the transmission of the RRC reconfiguration notification is performed before the transmission of the RRC reconfiguration message.

In the first embodiment, the RRC reconfiguration notification includes a content of the RRC reconfiguration.

In the first embodiment, the communication control method includes a step that the secondary base station, which receives the RRC reconfiguration notification, stops a transmission to the user terminal based on the RRC reconfiguration notification.

In the first embodiment, the secondary base station stops the transmission to the user terminal from a time of receiving the RRC reconfiguration notification until a lapse of a predetermined time. The predetermined time corresponds to a time from when the user terminal receives the RRC reconfiguration message until when the RRC reconfiguration message is reflected. The secondary base station resumes the transmission to the user terminal after the lapse of the predetermined time.

In the first embodiment, the communication control method includes a step that the master base station receives an RRC reconfiguration completion message from the user terminal, the RRC reconfiguration completion message indicating a completion of the RRC reconfiguration, a step of transmitting an RRC reconfiguration completion notification from the master base station to the secondary base station in response to the reception of the RRC reconfiguration completion message; and a step that the secondary base station, which receives the RRC reconfiguration completion notification, resumes the transmission to the user terminal based on the RRC reconfiguration completion notification.

In the first embodiment, the transmission stopped by the secondary base station in the stopping step is a transmission on a user dedicated channel.

A communication control method according to a second embodiment is a method for controlling communication by dual connectivity method using a master base station that establishes an RRC connection with a user terminal and a secondary base station that provides an additional radio resource to the user terminal. The communication control method includes a step that the master base station receives a measurement report from the user terminal, the measurement report including a measurement result obtained for each cell by the user terminal; and a step of selecting a special cell from among a plurality of cells managed by the secondary base station based on the measurement report, the special cell being a cell provided with a Physical Uplink Control Channel of the user terminal.

In the second embodiment, the step of selecting the special cell includes a step that the master base station, which receives measurement report, transfers the received measurement report to the secondary base station, and a step that the secondary base station, which receives the transferred measurement report, selects the special cell.

In the second embodiment, the step of selecting the special cell includes: a step that the master base station, which receives the measurement report, notifies a candidate of the special cell to the secondary base station based on the received measurement report, a step that the secondary base station selects the special cell based on the notified candidate.

In the second embodiment, the step of selecting the special cell comprises: a step that the master base station, which receives the measurement report, selects the special cell based on the received measurement report; and a step that the master base station notifies the selected special cell to the secondary base station.

In the second embodiment, in the step of selecting the special cell, the special cell is selected further based on a capability and/or a load status of each of the plurality of cells managed by the secondary base station.

In the second embodiment, the communication control method includes a step of transmitting information from the master base station to the user terminal based on a capability and/or a load status of each of the plurality of cells managed by the secondary base station, said information being used for controlling the transmission of the measurement report.

In the second embodiment, the communication control method includes a step of reselecting the special cell from among the plurality of cells managed by the secondary base station based on a measurement report transmitted newly from the user terminal.

A communication control method according to a third embodiment includes a step of transmitting cell information from a first base station to a second base station, the cell information indicating whether or not at least one cell managed by the first base station has a capability of operating as a special cell provided with a Physical Uplink Control Channel of the user terminal.

In the third embodiment, in the step of transmitting the cell information, the first base station transmits the cell information while including the cell information into a configuration update message concerning an update of a configuration of the first base station.

In the third embodiment, in the step of transmitting the cell information, the first base station includes the cell information in a negative response, when transmitting the negative response to a request from the second base station.

A communication control method according to a fourth embodiment is a method for a user terminal provided in a mobile communication system supporting a dual connectivity method, the user terminal that establishes an RRC connection with a master base station and that is provided an additional radio resource from a secondary base station. A secondary cell group is managed by the secondary base station, the secondary cell group including a special cell that a Physical Uplink Control Channel of the user terminal is set. The communication control method comprising a step of detecting a radio link failure in the special cell; and a step of transmitting a measurement result to the master base station upon the detection of the radio link failure in the special cell, said measurement result corresponding to the cell included in the secondary cell group.

In the fourth embodiment, in the step of transmitting, the user terminal further transmits the measurement result to master base station upon the detection of the radio link failure in the special cell, said measurement result corresponding to a neighbor cell.

In the fourth embodiment, said measurement result corresponds to a cell other than the special cell included in the secondary cell group.

In the fourth embodiment, the communication control method includes a step of transmitting a failure notification to the master base station, the failure notification notifying the radio link failure upon the detection of the radio link failure in the special cell. Said measurement result is included in the failure notification.

In the fourth embodiment, the communication control method includes a step of transmitting a measurement report of event trigger type to the master base station upon occurrence of an event designated by the master base station. The event is the detection of the radio link failure in the special cell. Said measurement result is included in the measurement report of event trigger type.

A communication control method according to a fourth embodiment is a method for a master base station that performs communication by dual connectivity method with a secondary base station that provides an additional radio resource to a user terminal, and that establishes an RRC connection with the user terminal. A secondary cell group is managed by the secondary base station, the secondary cell group including a special cell that a Physical Uplink Control Channel of the user terminal is set. The communication control method includes a step of receiving a failure notification from the user terminal, the failure notification that notifies a radio link failure in the special cell and includes a first measurement result corresponding to a cell other than the special cell included in the secondary cell group, and a step of transmitting a replacement request to the secondary base station, the replacement request being a request for a replacement of the special cell. In the step of transmitting, the master base station transmits the replacement request while including the first measurement result into the replacement request.

In the fourth embodiment, in the step of transmitting, the master base station further transmits a cause of the radio link failure in the special cell to the secondary base station.

In the fourth embodiment, in the step of receiving, the master base station receives a second measurement result corresponding to the special cell, in the step of transmitting, the master base station transmits the replacement request while including the first measurement result and the second measurement result into the replacement request.

A communication control method according to a fourth embodiment is a method for a secondary base station that performs communication by dual connectivity method with the master base station that establishes an RRC connection with a user terminal, and that provides an additional radio resource to the user terminal. A secondary cell group is managed by the secondary base station, the secondary cell group including a special cell that a Physical Uplink Control Channel of the user terminal is set. The communication control method includes a step of receiving a replacement request with a first measurement result from the master base station, the replacement request being a request for a replacement of the special cell, the first measurement result corresponding to a cell other than the special cell included in the secondary cell group; a step of making a determination whether or not to replace the special cell with the other cell based on the first measurement result; and a step of notifying a result of the determination to the master base station.

In the fourth embodiment, in the step of receiving, the secondary base station receives a second measurement result with the first measurement result from the master base station, the second measurement result corresponding to the special cell. In the step of making the determination, the secondary base station makes the determination based on the first measurement result and the second measurement result.

In the fourth embodiment, in the step of notifying, the secondary base station notifies the master base station of a new special cell, when the new special cell is selected from among the other cell.

In the fourth embodiment, in the step of notifying, the secondary base station notifies the master base station of a release of the secondary cell group, when a suitable cell for the new special cell is not included in the other cell.

[First Embodiment]

Hereinafter, an embodiment in a case where the present invention is applied to a LTE system will be described.

(System Configuration)

FIG. 1 is a configuration diagram of the LTE system according to the first embodiment.

As shown in FIG. 1, the LTE system includes UEs (User Equipments) 100, E-UTRAN (Evolved-UMTS Terrestrial Radio Access Network) 10, and EPC (Evolved Packet Core) 20.

The UE 100 corresponds to the user terminal. The UE 100 is a mobile communication device and performs radio communication with a cell (a serving cell). A configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. A configuration of the eNB 200 will be described later.

The eNB 200 manages a cell or a plurality of cells, and performs radio communication with the UE 100 that has established a connection with the cell. The eNB 200 has a radio resource management (RRM) function, a function of routing user data, and a measurement control function for mobility control and scheduling. It is noted that the "cell" is used as a term indicating a minimum unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME is a network node that performs various mobility controls and the like, for the UE 100. The S-GW performs control to transfer user data. The MME/S-GW 300 is connected to the eNBs 200 via an S1 interface.

Figure 2:
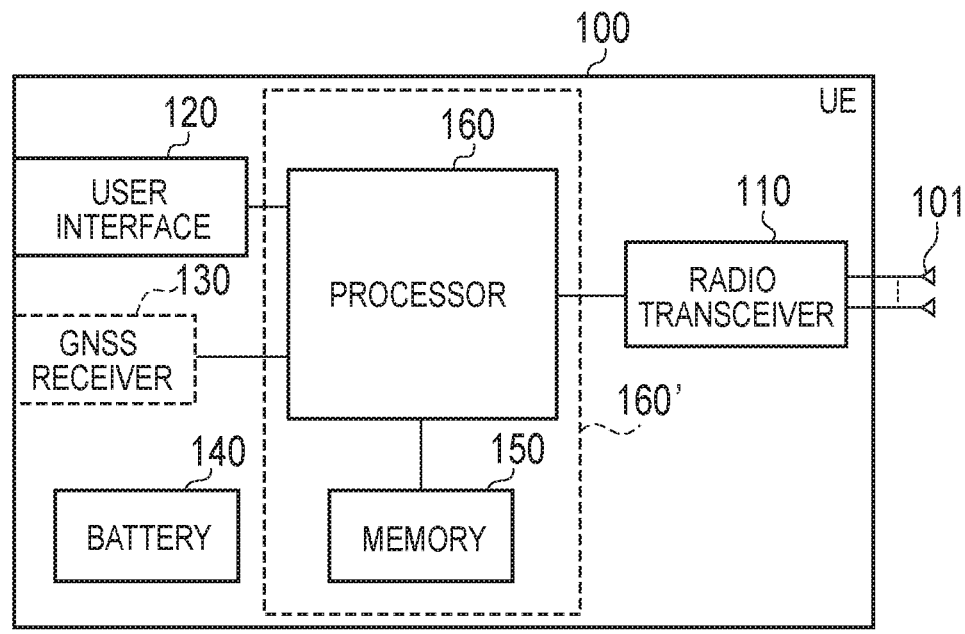
FIG. 2 is a block diagram of UE according to the first embodiment to the third embodiment.

FIG. 2 is a block diagram of the UE 100. As shown in FIG. 2, the UE 100 includes a plurality of antennas 101, a radio transceiver 110, a user interface 120, GNSS (Global Navigation Satellite System) receiver 130, a battery 140, a memory 150, and a processor 160. The memory 150 and the processor 160 configure a control unit. The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmitted signal) output from the processor 160 into the radio signal, and transmits the radio signal from the antenna 101. Furthermore, the radio transceiver 110 converts the radio signal received by the antenna 101 into the baseband signal (a received signal), and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
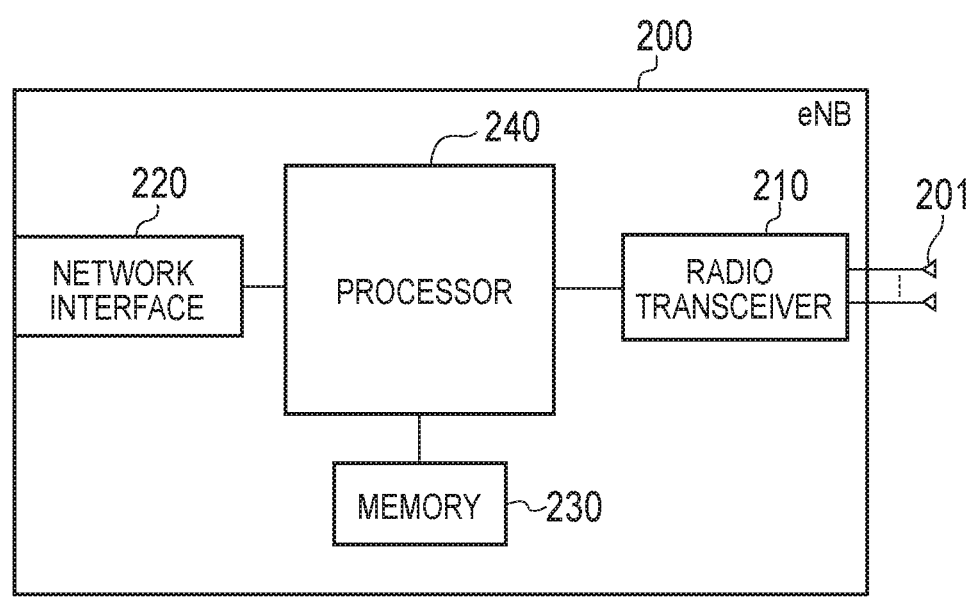
FIG. 3 is a block diagram of eNB according to the first embodiment to the third embodiment.

FIG. 3 is a block diagram of the eNB 200. As shown in FIG. 3, the eNB 200 includes a plurality of antennas 201, a radio transceiver 210, a network interface 220, a memory 230, and a processor 240. The memory 230 and the processor 240 constitute a control unit. In addition, the memory 230 is integrated with the processor 240, and this set (that is, a chipset) may be called a processor.

The antenna 201 and the radio transceiver 210 are used to transmit and receive a radio signal. The radio transceiver 210 converts the baseband signal (a transmitted signal) output from the processor 240 into the radio signal, and transmits the radio signal from the antenna 201. Furthermore, the radio transceiver 210 converts the radio signal received by the antenna 201 into the baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
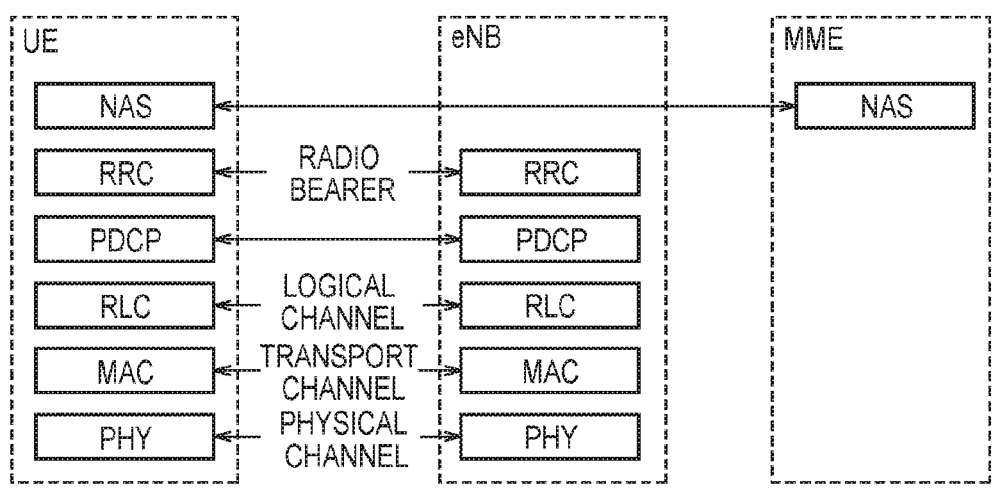
FIG. 4 is a protocol stack diagram of a radio interface according to the first embodiment to the third embodiment.

FIG. 4 is a protocol stack diagram of a radio interface in the LTE system. As shown in FIG. 4, the radio interface protocol is classified into a layer 1 to a layer 3 of an OSI reference model, wherein the layer 1 is a physical (PHY) layer. The layer 2 includes MAC (Media Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and a control signal are transmitted through the physical channel.

The MAC layer performs priority control of data, a retransmission process by hybrid ARQ (HARQ), a random access procedure at the time of the RRC connection establishment and the like. Between the MAC layer of the UE 100 and the MAC layer of the eNB 200, user data and a control signal are transmitted via a transport channel. The MAC layer of the eNB 200 includes a transport format of an uplink and a downlink (a transport block size, a modulation and coding scheme) and a scheduler to decide a resource block to be assigned for the UE 100.

The RLC layer transmits data to an RLC layer of a reception side by using the functions of the MAC layer and the PHY layer. Between the RLC layer of the UE 100 and the RLC layer of the eNB 200, user data and a control signal are transmitted via a logical channel.

The PDCP layer performs header compression and decompression, and encryption and decryption.

The RRC layer is defined only in a control plane managing a control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When a connection (the RRC connection) is established between the RRC of the UE 100 and the RRC of the eNB 200, the UE 100 is in an RRC connected state, and when the connection (the RRC connection) is not established, the UE 100 is in an RRC idle state.

NAS (Non-Access Stratum) layer positioned above the RRC layer performs session management, mobility management and the like.

In the LTE system, OFDMA (Orthogonal Frequency Division Multiple Access) is applied in a downlink, and SC-FDMA (Single Carrier Frequency Division Multiple Access) is applied in an uplink, respectively.

The radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. E Each resource block includes a plurality of subcarriers in the frequency direction. Among radio resources (time-frequency resources) assigned to the UE 100, a frequency resource can be designated by a resource block and a time resource can be designated by a subframe (or slot).

In the downlink, an interval of several symbols at the head of each subframe is a region mainly used as a physical downlink control channel (PDCCH) for transmitting a control signal. Furthermore, the remaining interval of each subframe is a region that can be mainly used as a physical downlink shared channel (PDSCH) for transmitting user data.

In the uplink, both end portions in the frequency direction of each subframe are regions mainly used as a physical uplink control channel (PUCCH) for transmitting a control signal. The other portion in the frequency direction of each subframe is a region that can be mainly used as a physical uplink shared channel (PUSCH) for transmitting user data.

(Dual Connectivity Method)

An LTE system according to the first embodiment supports a dual connectivity method. The dual connectivity method is expected to be introduced in Release 12 and thereafter. In the dual connectivity method, the UE 100 simultaneously establishes a connection with a plurality of eNBs 200. Because a radio resource is assigned to the UE 100 from each of the eNBs 200, it is possible to expect an improvement in throughput. It is noted that the dual connectivity method may be called an inter-eNB 200 carrier aggregation (inter-eNB CA).

Figure 5:
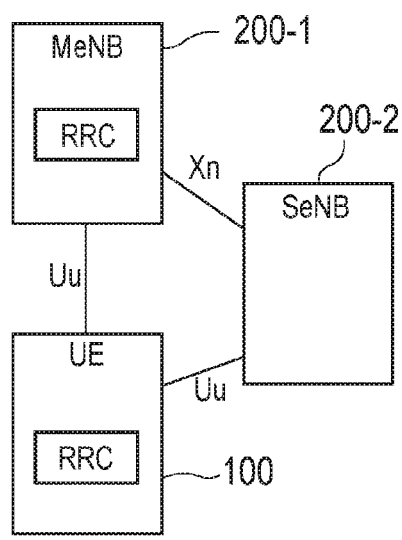
FIG. 5 is a configuration diagram of a radio frame according to the first embodiment to the third embodiment.

FIG. 5 is a diagram for describing an overview of the dual connectivity method.

As shown in FIG. 5, in the dual connectivity method, of the plurality of eNBs 200 that establish a connection with the UE 100, only a master eNB (MeNB) 200-1 establishes an RRC connection with the UE 100. On the other hand, of the plurality of eNBs 200, a secondary eNB (SeNB) 200-2 provides an additional radio resource to the UE 100 without establishing an RRC connection with the UE 100. In other words, the MeNB 200-1 establishes not only a user plane connection, but also a control plane connection with the UE 100. On the other hand, the SeNB 200-2 establishes a user plane connection with the UE 100, without establishing a control plane connection with the UE 100. An Xn interface is set between the MeNB 200-1 and the SeNB 200-2. The Xn interface is either an X2 interface or a new interface.

In the dual connectivity method, the UE 100 is capable of carrier aggregation using N number of cells managed by the MeNB 200-1 and M number of cells managed by the SeNB 200-2, simultaneously. In the dual connectivity method, the maximum number of serving cells of the UE 100, that is, the maximum number of (N+M) is five, for example. Here, a group composed of N number of cells managed by the MeNB 200-1 is called a master cell group (MCG). Moreover, a group composed of M number of cells managed by the SeNB 200-2 is called a secondary cell group (SCG). In the SCG, a special cell provided with PUCCH of the UE 100 is set. The special cell performs some of the functions of a primary cell (PCell) in carrier aggregation. Hereinafter, the special cell will be called a "DC special cell".

FIGS. 6A and 6B, and FIGS. 7A and 7B are diagrams for illustrating a configuration format of the transfer route (data path) of user data in a dual connectivity method. There are mainly two types of user plane architecture (UP architectures) constituting the transfer route (data path) of user data in the dual connectivity method.

Figure 6A:
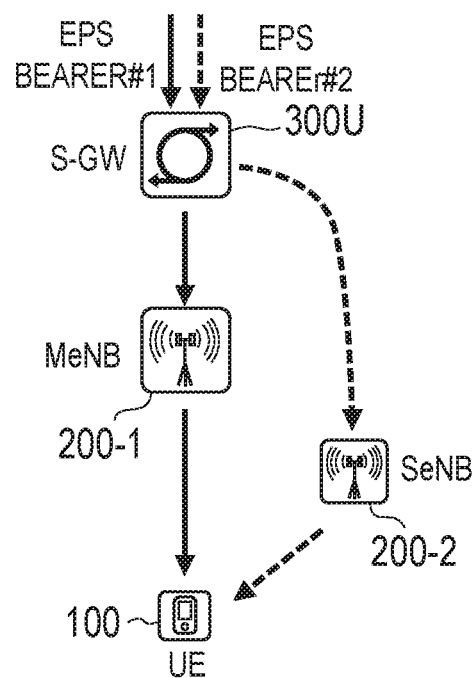
FIGS. 6A and 6B are diagrams showing a first UP architecture.
Figure 6B:
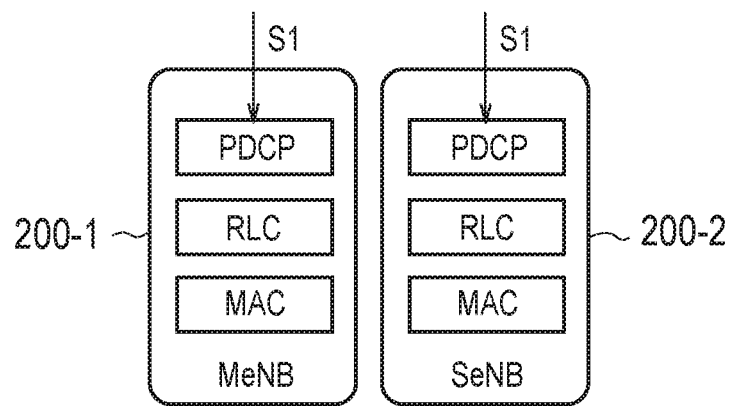

FIGS. 6A and 6B show a first UP architecture. As shown in FIG. 6A, in the first UP architecture, an S1-U interface between the MeNB 200-1 and S-GW 300U, and an S1-U interface between SeNB 200-2 and the S-GW 300U are used. An EPS bearer #1 between the UE 100 and the P-GW passes through the S1-U interface between the MeNB 200-1 and the S-GW 300U. An EPS bearer #2 between the UE 100 and the P-GW passes through the S1-U interface between the SeNB 200-2 and the S-GW 300U. Thus, in the first UP architecture, the data path between the SeNB 200-2 and S-GW 300U does not pass through the MeNB 200-1. As shown in FIG. 6B, each of the MeNB 200-1 and the SeNB 200-2 performs the processing of each layer of PDCP, RLC, and MAC.

Figure 7A:
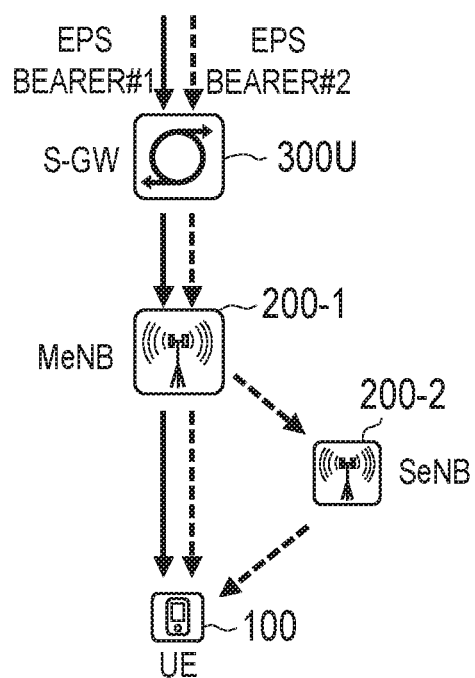
FIGS. 7A and 7B are diagrams showing a second UP architecture.
Figure 7B:
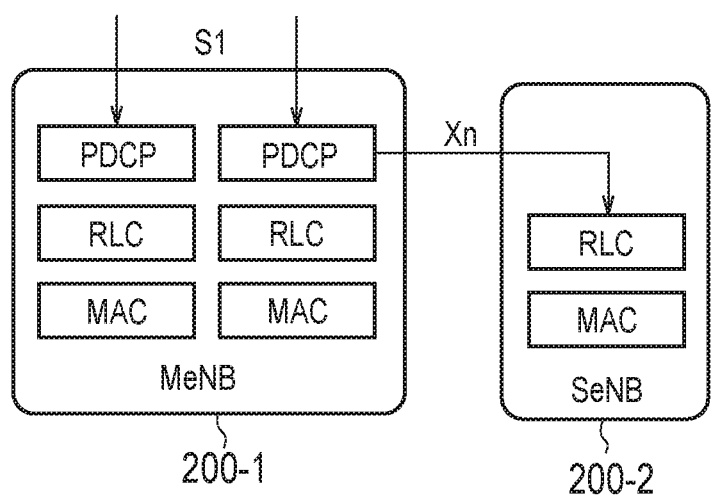

FIGS. 7A and 7B show a second UP architecture. As shown in FIG. 7A, in the second UP architecture, the EPS bearer #2 between the UE 100 and the P-GW is split in the MeNB 200-1, and while one of the split parts (a split bearer)

terminates in the UE 100 after passing through the SeNB 200-2, the other split part (a split bearer) terminates in the UE 100 without passing through the SeNB 200-2. Thus, in the second UP architecture, the data path between the SeNB 200-2 and S-GW 300U passes through the MeNB 200-1. As shown in FIG. 7B, in one of the divided parts (the split bearer) of the EPS bearer #2, the processing of each layer is performed by the PDCP of the MeNB 200-1, and the RLC and MAC of the SeNB 200-2. It is noted that in the split bearer, the MeNB may take charge the processing up to the RLC (or some functions of the RLC).

FIG. 8 is a sequence diagram showing an operation of starting the dual connectivity method. In the initial state of FIG. 8, the UE 100 establishes an RRC connection with the MeNB 200-1.

As shown in FIG. 8, in step S11, the UE 100 transmits, to the MeNB 200-1, a measurement report including the measurement result obtained for each cell in the UE 100. The measurement result includes a combination of identification information of the measurement cell and the reference signal received power (RSRP)/reference signal reception quality (RSRQ).

In step S12, the MeNB 200-1 having received the measurement report, decides the use of an SeNB resource on the basis of the received measurement report or another parameter.

In step S13, the MeNB 200-1 transmits, to the SeNB 200-2, an SeNB addition request (SeNB Addition) for requesting resource assignment to the UE 100. The SeNB addition request includes various parameters concerning the UE 100.

In step S14, the SeNB 200-2 having received the SeNB addition request, determines whether or not to authorize resource assignment to the UE 100 on the basis of the received SeNB addition request. When resource assignment to the UE 100 is authorized, the SeNB 200-2 sets a radio resource (for example, the DC special cell) for the UE 100. The SeNB 200-2 may select the random access preamble to be assigned to the UE 100.

In step S15, the SeNB 200-2 transmits, to the MeNB 200-1, an SeNB addition instruction for providing a new radio resource configuration (for example, a configuration of the DC special cell, or a random access preamble configuration).

In step S16, the SeNB 200-2 sets a parameter of a DC special cell depending on the new radio resource configuration. It is noted that the order of step S15 and step S16 may be reverse.

In step S17, the MeNB 200-1 having received the SeNB addition instruction, generates an RRC message to be transmitted to the UE 100 on the basis of the received SeNB addition instruction.

In step S18, the MeNB 200-1 transmits, to the UE 100, the generated RRC message (an RRC reconfiguration message).

In step S19, the UE 100 having received the RRC reconfiguration message, generates a MAC entity corresponding to the SCG on the basis of the received RRC reconfiguration message. Here, the DC special cell included in the SCG is in an activated state, and another cell included in the SCG is in a deactivated state.

In step S21, the UE 100 transmits, to the MeNB 200-1, an RRC reconfiguration completion message indicating the completion of RRC reconfiguration.

In step S22, the UE 100 performs a random access to the SeNB 200-2.

In step S23, the SeNB 200-2 detects synchronization with the UE 100, and transmits a notification (SeNB Addition complete), to the MeNB 200-1, indicating that the new radio resource configuration is available.

In step S24, the SeNB 200-2 uses the DC special cell to transmit a downlink control signal to the UE 100 over the PDCCH, and transmit downlink user data to the UE 100 over the PDSCH.

In step S25, the SeNB 200-2 decides to start the use of other cells included in the SCG, in the MAC layer.

In step S26, the SeNB 200-2 transmits, to the UE 100, a MAC control element indicating the activation of other cells included in the SCG.

In step S27, the UE 100 having received the MAC control element activates the other cells included in the SCG on the basis of the received MAC control element.

(Communication Control Method According to the First Embodiment)

FIG. 9 is a sequence diagram showing an operation when the MeNB 200-1 performs an RRC reconfiguration for the UE 100. The UE 100 is in a state in which a connection has been established between the MeNB 200-1 and the SeNB 200-2 (step S101).

As shown in FIG. 9, in step S102, the MeNB 200-1 transmits, to the UE 100, an RRC reconfiguration message for performing RRC reconfiguration for the UE 100. For example, in the case of MCG: three cells and SCG: two cells, it is assumed that the RRC reconfiguration message indicates a change to MCG: four cells and SCG: one cell.

Here, the time from when the UE 100 receives an RRC reconfiguration message until when the RRC reconfiguration message is reflected is approximately 15 ms (step S103). Until the RRC reconfiguration message is reflected, the MeNB 200-1 stops the PDSCH assignment to the UE 100 (step S104).

On the other hand, because the SeNB 200-2 does not know that the UE 100 is in the process of RRC reconfiguration, the SeNB 200-2 continues the PDSCH assignment to the UE 100, transmits the downlink control signal to the UE 100 over the PDCCH, and transmits the downlink user data to the UE 100 over the PDSCH (steps S105 to S108).

However, during the period in which the UE 100 is in the process of RRC reconfiguration, the UE 100 is not capable of receiving the downlink control signal and the downlink user data from the SeNB 200-2, and as a result, the assignment and transmission of steps S105 to S107 are wasted.

Thus, in the first embodiment, the problem described above is resolved by the method shown below.

The communication control method according to the first embodiment includes a step of transmitting, from the MeNB 200-1 to the UE 100, an RRC reconfiguration message for performing an RRC reconfiguration of the UE 100, and a step of transmitting, from the MeNB 200-1 to the SeNB 200-2, an RRC reconfiguration notification for notifying about the transmission of the RRC reconfiguration message. The SeNB 200-2 having received the RRC reconfiguration notification stops the transmission to the UE 100 on the basis of the RRC reconfiguration notification. As a result, the MeNB 200-1 is capable of knowing that the UE 100 is in the process of RRC reconfiguration, which enables the MeNB 200-1 to prevent the wasteful assignment and transmission to the UE 100.

It is noted that the transmission stopped by the SeNB 200-2 is the transmission on a user dedicated channel (for example, DTCH: Dedicated Traffic CHannel, and DCCH: Dedicated Control CHannel). Thus, even though the SeNB 200-2 stops the transmission of the user dedicated channel to the UE 100, the SeNB 200-2 may continue the broadcast transmission, such as paging.

In the first embodiment, the transmission of the RRC reconfiguration notification is performed before the transmission of the RRC reconfiguration message. As a result, even when a transmission delay occurs in a backhaul (the Xn interface), it is possible that the timing of reception of the RRC reconfiguration notification by the SeNB 200-2 matches with the transmission timing of the RRC reconfiguration message.

In the first embodiment, the RRC reconfiguration notification includes the contents of RRC reconfiguration. Thus, the SeNB 200-2 is capable of knowing the contents of RRC reconfiguration performed by the MeNB 200-1 for the UE 100, and this enables the SeNB 200-2 to perform appropriate communication control.

In the first embodiment, the SeNB 200-2 stops the transmission to the UE 100 from the time of receiving the RRC reconfiguration notification until the lapse of a predetermined time. The predetermined time corresponds to the time from when the UE 100 receives the RRC reconfiguration message until when the RRC reconfiguration message is reflected. The SeNB 200-2 resumes the transmission to the UE 100 after the lapse of the predetermined time. Thus, the SeNB 200-2 is capable of resuming the transmission to the UE 100 as soon as the RRC reconfiguration of the UE 100 is complete.

Alternatively, rather than autonomously resuming the transmission, the SeNB 200-2 may resume the transmission upon receiving a notification from the MeNB 200-1. In such a case, the communication control method includes a step of receiving, by the MeNB 200-1 from the UE 100, an RRC reconfiguration completion message indicating the completion of RRC reconfiguration, a step of transmitting, from the MeNB 200-1 to the SeNB 200-2, an RRC reconfiguration completion notification upon the reception of the RRC reconfiguration completion message, and a step of resuming transmission to the UE 100, by the SeNB 200-2 that receives the RRC reconfiguration completion notification, on the basis of the RRC reconfiguration completion notification.

(Operation Sequence According to the First Embodiment)

FIG. 10 is a sequence diagram showing an operation sequence according to the first embodiment. The UE 100 is in a state in which a connection has been established between the MeNB 200-1 and the SeNB 200-2 (step S151).

As shown in FIG. 10, in step S152, the MeNB 200-1 transmits, to the SeNB 200-2, an RRC reconfiguration notification (RRC Connection Reconfiguration Initiation). The RRC reconfiguration notification includes at least one of an RRC container for storing the RRC configuration (RRC Configuration) and a flag indicating start/end. Here, with the RRC container, the SeNB 200-2 is capable of knowing the contents of the RRC configuration, and therefore, the SeNB 200-2 is capable of determining whether to stop transmission on the basis of the contents of the RRC configuration. The RRC reconfiguration notification may include a threshold value of the timer used in step S156 described later.

The RRC reconfiguration notification is preferably transmitted at a timing that is earlier than the transmission timing of the RRC reconfiguration message by only as much as the transmission delay time of the backhaul (the Xn interface).

In step S153, the MeNB 200-1 transmits an RRC reconfiguration message to the UE 100. The UE 100 having received the RRC reconfiguration message starts the RRC reconfiguration on the basis of the received RRC reconfiguration message.

In step S154, the MeNB 200-1 stops the PDSCH assignment to the UE 100 until the RRC reconfiguration message is reflected.

In step S155, the SeNB 200-2 having received the RRC reconfiguration notification stops the transmission to the UE 100 on the basis of the received RRC reconfiguration notification.

In step S156, the SeNB 200-2 starts a timer for clocking the predetermined time. The predetermined time corresponds to the time from when the UE 100 receives the RRC reconfiguration message until when the RRC reconfiguration message is reflected.

In step S157, the UE 100 transmits an RRC reconfiguration message to the MeNB 200-1.

In step S158, the MeNB 200-1 may transmit, to the SeNB 200-2, an RRC reconfiguration completion notification (RRC Connection Reconfiguration complete) upon receiving the RRC reconfiguration completion message.

In step S159, the SeNB 200-2 detects either the expiry of the timer, or the reception of the RRC reconfiguration completion notification.

In step S160, the SeNB 200-2 detects the expiry of the timer or the reception of the RRC reconfiguration completion notification, and resumes the transmission to the UE 100.

[Second Embodiment]

Hereinafter, a communication control method according to a second embodiment will be described while focusing on the differences from the first embodiment.

(Communication Control Method According to the Second Embodiment)

As described earlier, to the SCG, a DC special cell in which PUCCH of the UE 100 is provided is set. Here, the DC special cell is desired to be a cell having a favorable communication state as compared to the other cells of the SCG. A cell having a favorable communication state is, for example, a cell having a high received power of a desired wave, a cell having a low interference power, or a cell having a low load level. If the communication state is unfavorable in the DC special cell, the uplink control signal is not transmitted normally, thus making it difficult to appropriately execute communication by the dual connectivity method.

Thus, in the second embodiment, the problem described above is resolved by the method shown below.

The communication control method according to the second embodiment includes a step of receiving, by the MeNB 200-1 from the UE 100, a measurement report including a measurement result obtained for each cell in the UE 100, and a step of selecting a DC special cell in which a Physical Uplink Control Channel of the UE 100 is provided, from among a plurality of cells managed by the SeNB 200-2 on the basis of the measurement report. This enables the selection of a cell having a favorable communication state in the UE 100 as a DC special cell, and thus making it possible to appropriately execute communication by the dual connectivity method.

In the second embodiment, the step of selecting the DC special cell includes a step of transferring, by the MeNB 200-1 that receives the measurement report, to the SeNB 200-2, the received measurement report, and a step of selecting the DC special cell, by the SeNB 200-2 that receives the transferred measurement report.

Alternatively, the step of selecting the DC special cell includes a step of notifying, by the MeNB 200-1 that receives the measurement report, to the SeNB 200-2, a candidate of the DC special cell on the basis of the received measurement report, and a step of selecting the DC special cell, by the SeNB 200-2 on the basis of the notified candidate.

Alternatively, the step of selecting the DC special cell includes a step of selecting the DC special cell, by the MeNB 200-1 that receives the measurement report on the basis of the received measurement report, and a step of notifying the selected DC special cell from the MeNB 200-1 to the SeNB 200-2.

In the second embodiment, in the step of selecting the DC special cell, the DC special cell may be selected further on the basis of the capability and/or the load status of each of the plurality of cells managed by the SeNB 200-2.

The communication control method according to the second embodiment may include a step of transmitting, from the MeNB 200-1 to the UE 100, information for controlling the transmission of the measurement report on the basis of the capability and/or the load status of each of the plurality of cells managed by the SeNB 200-2.

The communication control method according to the second embodiment may further include a step of reselecting the DC special cell from the plurality of cells managed by the SeNB 200-2 on the basis of a measurement report newly transmitted from the UE 100.

(Operation According to the Second Embodiment)
(1) Operation Pattern 1

Figure 11:
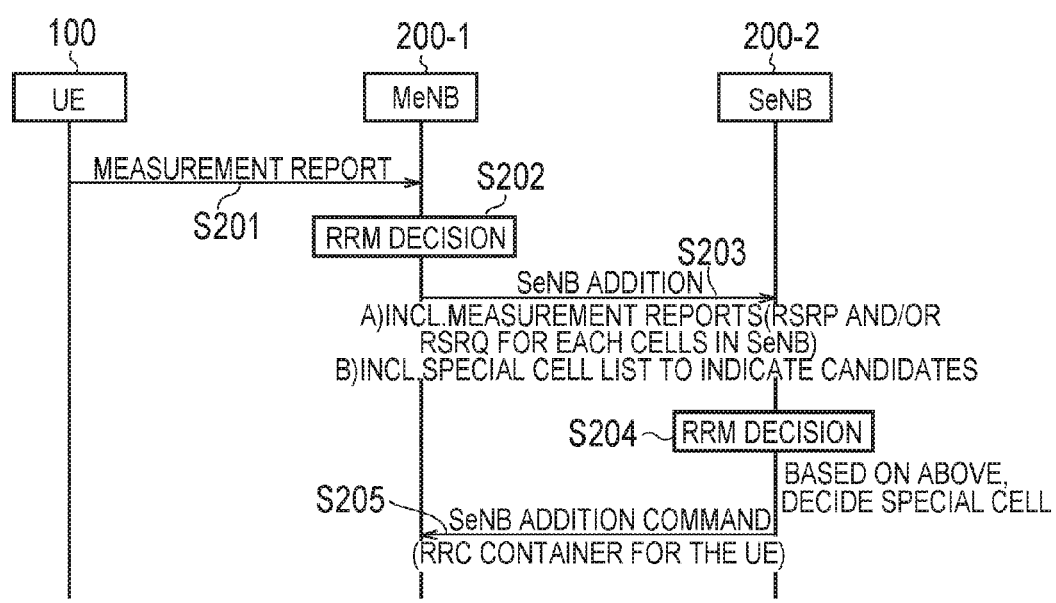
FIG. 11 is a sequence diagram showing an operation pattern 1 according to a second embodiment.

In an operation pattern 1 according to the second embodiment, the SeNB 200-2 selects the DC special cell. FIG. 11 is a sequence diagram showing the operation pattern 1 according to the second embodiment. The UE 100 is in a state in which an RRC connection has been established with the MeNB 200-1.

As shown in FIG. 11, in step S201, the UE 100 transmits, to the MeNB 200-1, a measurement report including the measurement result determined for each cell in the UE 100. The measurement result includes a combination of identification information of the measurement cell and the reference signal received power (RSRP)/reference signal reception quality (RSRQ).

In step S202, the MeNB 200-1 having received the measurement report decides the use of an SeNB resource on the basis of the received measurement report.

In step S203, the MeNB 200-1 transmits, to the SeNB 200-2, an SeNB addition request (SeNB Addition).

Here, the MeNB 200-1 includes the measurement report received from the UE 100 in the SeNB addition request. That is, the MeNB 200-1 transfers the measurement report received from the UE 100 to the SeNB 200-2. Of the measurement results included in the measurement report received from the UE 100, the MeNB 200-1 may extract the measurement result for a cell of the SeNB 200-2, and transfer the same to the SeNB 200-2.

Alternatively, of the measurement results included in the measurement report received from the UE 100, the MeNB 200-1 may extract one or a plurality of cells of the SeNB 200-2 having a favorable communication state, and may include (a list of) the candidate cells which are extracted cells in the SeNB addition request.

In step S204, the SeNB 200-2 having received the SeNB addition request determines whether or not to authorize resource assignment to the UE 100 on the basis of the received SeNB addition request. When resource assignment to the UE 100 is authorized, the SeNB 200-2 selects the DC special cell on the basis of information included in the SeNB addition request.

In step S205, the SeNB 200-2 transmits, to the MeNB 200-1, an SeNB addition instruction for providing a new radio resource configuration (for example, a configuration of the DC special cell, or a random access preamble configuration).

(2) Operation Pattern 2

Figure 12:
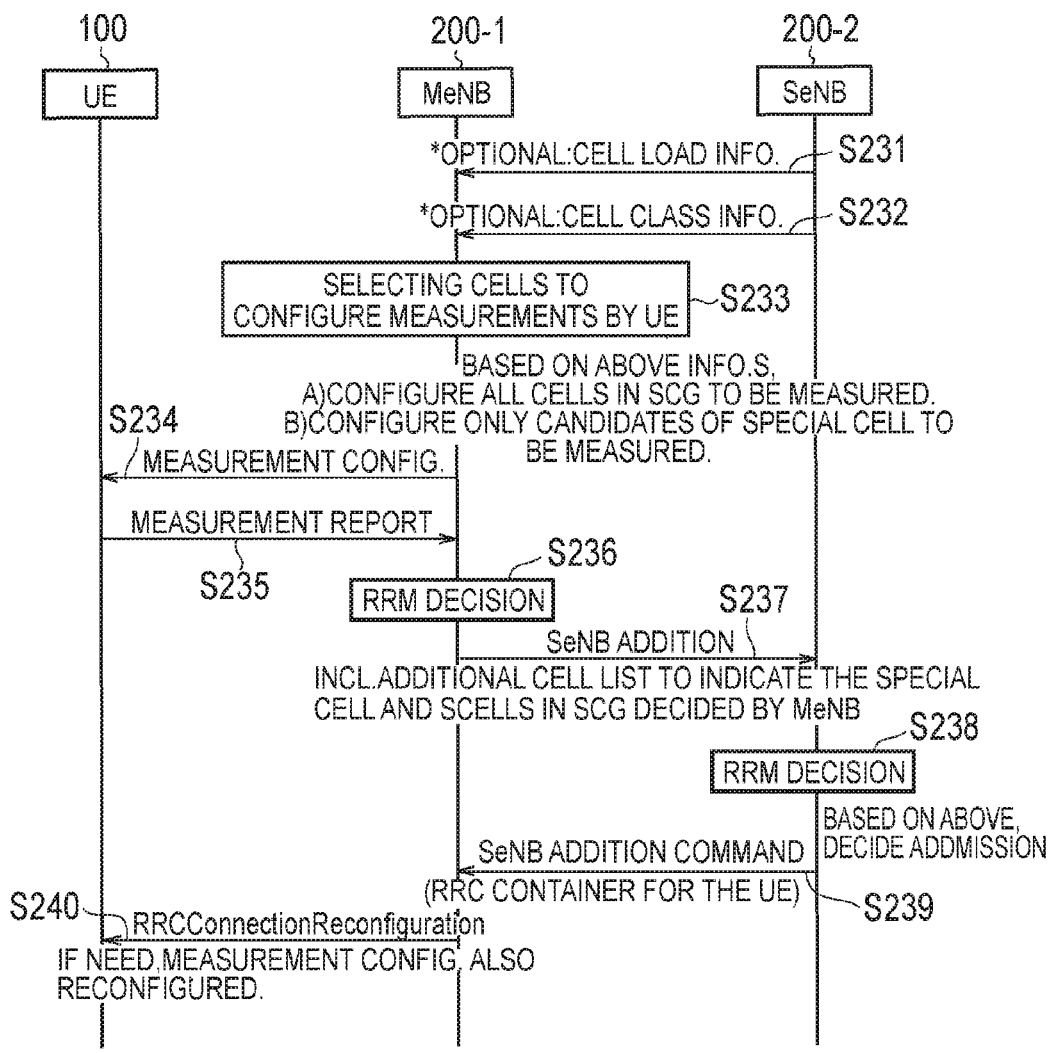
FIG. 12 is a sequence diagram showing an operation pattern 2 according to the second embodiment.

In an operation pattern 2 according to the second embodiment, the MeNB 200-1 selects the DC special cell. FIG. 12 is a sequence diagram showing the operation pattern 2 according to the second embodiment. The UE 100 is in a state in which an RRC connection has been established with the MeNB 200-1.

As shown in FIG. 12, in step S231, the SeNB 200-2 transmits, to the MeNB 200-1, information showing the load level of each cell of the SeNB 200-2.

In step S232, the SeNB 200-2 transmits, to the MeNB 200-1, information showing the class of each cell of the SeNB 200-2. The details of the class (the type) of cells are provided in a third embodiment.

It is noted that only one of step S231 and step S232 may be provided.

In step S233, of the cells of the SeNB 200-2, the MeNB 200-1 selects the cells for which the measurement of the UE 100 is to be performed. Of the cells of the SeNB 200-2, the MeNB 200-1 may select a cell having a low load level, or a cell having a capability of operating as a DC special cell as the measurement target cell on the basis of information received from the SeNB 200-2.

In step S234, the MeNB 200-1 transmits, to the UE 100, a measurement configuration (Measurement Config.) for setting the measurement of the measurement target cell. The UE 100 having received the measurement configuration performs measurement for each cell of the SeNB 200-2 on the basis of the received measurement configuration.

In step S235, the UE 100 transmits, to the MeNB 200-1, a measurement report including the measurement result.

It is possible to apply the procedures of step S231 through S235 to the aforementioned operation pattern 1.

In step S236, the MeNB 200-1 having received the measurement report, decides the use of the SeNB resource on the basis of the received measurement report. Moreover, of the measurement results included in the measurement report received from the UE 100, the MeNB 200-1 selects a cell of the SeNB 200-2 having a favorable communication state as the DC special cell.

In step S237, the MeNB 200-1 transmits, to the SeNB 200-2, an SeNB addition request (SeNB Addition). Here, the MeNB 200-1 includes the information on the selected DC special cell in the SeNB addition request.

In step S238, the SeNB 200-2 having received the SeNB addition request, determines whether or not to authorize resource assignment to the UE 100 on the basis of the received SeNB addition request. When resource assignment to the UE 100 is authorized, the SeNB 200-2 sets the DC special cell on the basis of information on the DC special cell included in the SeNB addition request.

In step S239, the SeNB 200-2 transmits, to the MeNB 200-1, an SeNB addition instruction for providing a new radio resource configuration (for example, a configuration of the DC special cell, or a random access preamble configuration).

In step S240, the MeNB 200-1 having received the SeNB addition instruction transmits an RRC reconfiguration message to the UE 100. Here, the MeNB 200-1 may cancel the above-described special measurement configuration (Measurement Config.) and make new measurement configurations.

(3) Operation Pattern 3

In an operation pattern 3 of the second embodiment, after selecting the DC special cell, the MeNB 200-1 or the SeNB 200-2 reselects the DC special cell on the basis of the measurement report newly transmitted from the UE 100.

Figure 13:
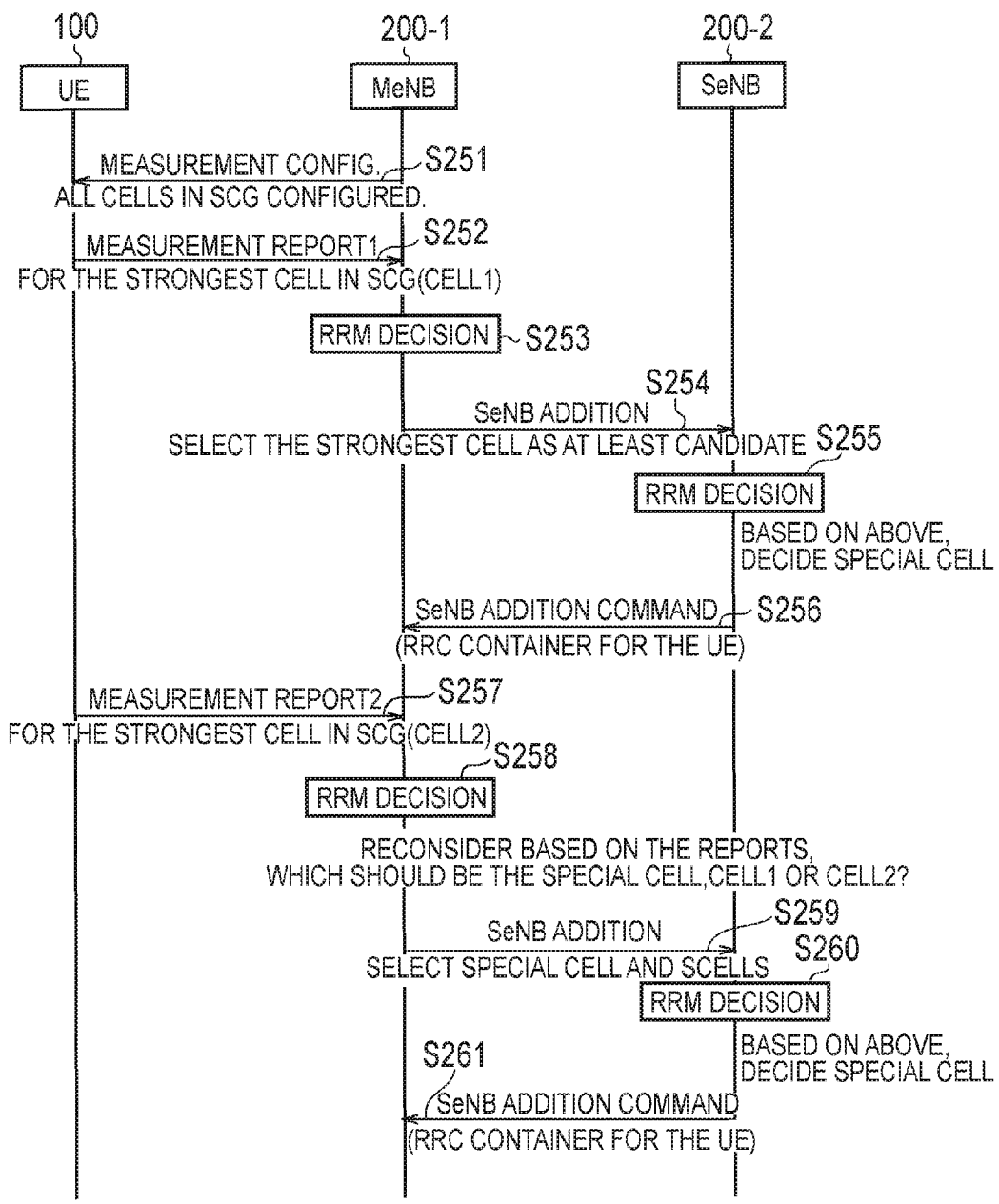
FIG. 13 is a sequence diagram showing an operation pattern 3 according to the second embodiment.

FIG. 13 is a sequence diagram showing an operation pattern 3 according to the second embodiment. The UE 100 is in a state in which an RRC connection has been established with the MeNB 200-1.

In step S251, the MeNB 200-1 transmits, to the UE 100, a measurement configuration (Measurement Config.) for setting the measurement of the measurement target cell. The UE 100 having received the measurement configuration performs measurement for each cell of the SeNB 200-2 on the basis of the received measurement configuration.

In step S252, the UE 100 transmits, to the MeNB 200-1, a measurement report 1 including the measurement result.

In step S253, the MeNB 200-1 having received the measurement report 1, decides the use of the SeNB resource on the basis of the received measurement report 1. Moreover, of the measurement results included in the measurement report 1 received from the UE 100, the MeNB 200-1 selects a cell of the SeNB 200-2 having a favorable communication state as a DC special cell 1.

In step S254, the MeNB 200-1 transmits, to the SeNB 200-2, an SeNB addition request (SeNB Addition). Here, the MeNB 200-1 includes the information on the selected DC special cell 1 in the SeNB addition request.

In step S255, the SeNB 200-2 having received the SeNB addition request, determines whether or not to authorize resource assignment to the UE 100 on the basis of the received SeNB addition request. When resource assignment to the UE 100 is authorized, the SeNB 200-2 sets the DC special cell 1 on the basis of information on the DC special cell 1 included in the SeNB addition request.

In step S256, the SeNB 200-2 transmits, to the MeNB 200-1, an SeNB addition instruction for providing a new radio resource configuration (for example, a configuration of the DC special cell, or a random access preamble configuration).

In step S257, the UE 100 transmits, to the MeNB 200-1, a measurement report 2 including the measurement result.

In step S258, of the measurement results included in the received measurement report 2, the MeNB 200-1 having received the measurement report 2 selects a cell of the SeNB 200-2 having a favorable communication state as a DC special cell 2. Also, the MeNB 200-1 determines which of the DC special cell 1 selected previously and the DC special cell 2 selected currently is optimum as the DC special cell, and then reselects the DC special cell.

In step S259, the MeNB 200-1 transmits, to the SeNB 200-2, an SeNB addition request (SeNB Addition). Here, the MeNB 200-1 includes the information on the selected DC special cell and another cell (SCell) in the SeNB addition request.

In step S260, the SeNB 200-2 having received the SeNB addition request sets the DC special cell on the basis of information on the DC special cell included in the received SeNB addition request.

In step S261, the SeNB 200-2 transmits, to the MeNB 200-1, an SeNB addition instruction for providing a new radio resource configuration (for example, a configuration of the DC special cell, or a random access preamble configuration).

[Third Embodiment]

Hereinafter, a third embodiment will be described while focusing on the differences from the first and the second embodiments.

(Communication Control Method According to Third Embodiment)

As described below, in the recent years, special band operation methods are being examined in addition to a usual band operation methods (for example, the downlink/uplink pair configuration).

Supplemental DL: A downlink-dedicated band

Unlicensed band: It is a band for which a license is not required, and is mainly used in best-effort type communications Shared license band: It is a band in which a plurality of operators exist in a single band, and is mainly used in best-effort type communications White space: It is a band that reuses the available time and location of the license band of another company, and is mainly used in best-effort type communications As a prerequisite, such special bands must be used as an SCell. In other words, the following problems exist.

A handover request, even if performed, may be denied (not turned to a PCell)

An attempt of setting to a DC special cell may be denied

Thus, in the third embodiment, unnecessary processing (reject), and an increase in RLF/HOF (Handover Failure) and a decline in QoE which are accompanied with this are avoided by the following method.

The communication control method according to the third embodiment includes a step of transmitting, from a first base station to a second base station, cell information indicating whether or not at least one cell managed by the first base station has a capability of operating as a cell on which a Physical Uplink Control Channel of the UE 100 (a PCell or a DC special cell) is provided. The first base station may be the SeNB 200-2. Moreover, the second base station may be the MeNB 200-1.

In the third embodiment, in the step of transmitting the cell information, the first base station includes cell information in the configuration update message concerning an update of the configuration of the first base station, and then transmits the cell information therein.

In the third embodiment, in the step of transmitting cell information, when transmitting a negative response to a request from the second base station, the first base station includes the cell information into the negative response.

(Operation Sequence According to Third Embodiment)

Figure 14:
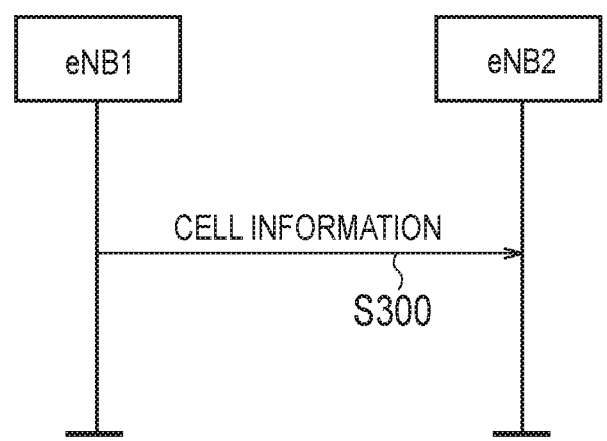
FIG. 14 is an operation sequence diagram according to a third embodiment.

FIG. 14 is an operation sequence diagram according to the third embodiment.

As shown in FIG. 14, in step S300, eNB 1 transmits, to an eNB 2, cell information indicating whether or not at least one cell managed by the eNB 1 has a capability of operating as a cell (a PCell or a DC special cell) on which a Physical Uplink Control Channel of the UE 100 is provided.

As shown in Table 1, the cell information (HO possible) may be included in Served Cell Information of an eNB Configuration Update message concerning an update of the eNB configuration, or an X2 setup message for establishing an X2 interface.

TABLE 1

| IE/Group Name | Presence | Range | IE type and reference | Semantics description |
|---|---|---|---|---|
| PCI | M | | INTEGER (0 . . . 503, . . .) | Physical Cell ID |
| Cell ID | M | | ECGI 9.2.14 | |

TABLE 1-continued

| IE/Group Name | Presence | Range | IE type and reference | Semantics description |
|---|---|---|---|---|
| TAC | M | | OCTET STRING(2) | Tracking Area Code |
| [. . .] | | | | |
| HO possible | O | | ENUMERATED (Possible, impossible, . . .) | The cell can become PCell and/or Special Cell for dual connectivity. |

Alternatively, as shown in Table 2, the cell information (HO possible) may be included in the Cause in HO Preparation Failure, which is a negative response to a handover request, or an SeNB Addition/Modification failure, which is a negative response to an SeNB Addition/Modification. The eNB 2 having received the Cause stores that the cell does not have the capability of operating as a PCell/DC special cell.

TABLE 2

| IE/Group Name | Presence | Range | IE Type and Reference |
|---|---|---|---|
| CHOICE Cause Group | M | | |
| >Radio Network Layer | | | |
| >>Radio Network Layer Cause | M | | ENUMERATED (Handover Desirable for Radio Reasons, Time Critical Handover, Resource Optimisation Handover, Reduce Load in Serving Cell, . . . No PCell functionality, No Special Cell functionality,) |
| [. . .] | | | |

[Fourth Embodiment]

Hereinafter, a fourth embodiment will be described while focusing on the differences from the first embodiment to the third embodiment. The fourth embodiment is an embodiment concerning a modification of the second embodiment. Therefore, the fourth embodiment will be described while focusing on the differences from the second embodiment.
(Communication Control Method According to Fourth Embodiment)

In the above-described second embodiment, S-RLF, which is a radio link failure (RLF) in SCG was not particularly described. In the fourth embodiment, mainly the operation during the occurrence of the S-RLF will be described.

In the fourth embodiment, the UE 100 detects RLF for the DC special cell in the SCG. Even when a plurality of cells are included in the SCG, the UE 100 detects only the RLF of the DC special cell among the plurality of cells. As described earlier, the DC special cell is a special cell in the SCG on which PUCCH of the UE 100 is provided. The DC special cell performs some of the functions of a primary cell (PCell) in carrier aggregation. The DC special cell may also be referred to as a primary secondary cell (PSCell). Moreover, a cell other than the DC special cell in the SCG may be referred to as secondary cell (SCell).

Upon detecting RLF of the DC special cell, the UE 100 transmits, to the MeNB 200-1, a failure notification for notifying the S-RLF. Hereinafter, such a failure notification is referred to as "S-RLF indication". Here, the two proposed operations described below are assumed as operations of the UE 100 after the S-RLF indication is transmitted. The first proposed operation is an operation in which the UE 100 releases all secondary cells (that is, the SCG) belonging to the SeNB 200-2. The second proposed operation is an operation in which the UE 100 awaits an RRC reconfiguration message (an RRC Connection Reconfiguration message) from the MeNB 200-1, and follows the contents of the RRC reconfiguration message.

However, the first proposed operation has the problem described below. Even when RLF occurs in the DC special cell, it may be possible to expect that the communication state of the secondary cells other than the DC special cell is favorable. However, the release of all secondary cells (the SCG) belonging to the SeNB 200-2 may not be the most appropriate option.

The second proposed operation has the problem described below. A precondition in the second proposed operation is that the MeNB 200-1 determines whether the UE 100 should release all secondary cells (the SCG) belonging to the SeNB 200-2, or the UE 100 should resume communication using the other secondary cells. However, the MeNB 200-1 does not have the information for appropriately performing the determination.

Thus, in the fourth embodiment, the UE 100, for example, includes either the latest measurement results or information corresponding thereto in the S-RLF indication. The MeNB 200-1 transfers the information to the SeNB 200-2 and requests the SeNB 200-2 to examine whether the DC special cell should be replaced, or the SCG should be released. Upon receiving the result, the MeNB 200-1 decides the operation of the UE 100, and instructs the same to the UE 100.

The communication control method according to the fourth embodiment is a method in the UE 100 that establishes an RRC connection with the MeNB 200-1 and in which additional radio resources are provided from the SeNB 200-2, in a mobile communication system supporting the dual connectivity method. The SCG that includes the DC special cell in which PUCCH of the UE 100 is set is managed by the SeNB 200-2. The communication control method includes a step of detecting the S-RLF in the DC special cell, and a step of transmitting, to the MeNB 200-1, a first measurement result for a cell other than the DC special cell in the SCG, when S-RLF is detected in the DC special cell. This enables the MeNB 200-1 to acquire information for determining whether all secondary cells (the SCG) belonging to the SeNB 200-2 should be released, or the communication should be resumed using the other secondary cells. The first measurement result may include a plurality of measurement results corresponding to a plurality of cells.

In the fourth embodiment, when the UE 100 detects S-RLF in the DC special cell, the UE 100 may further transmit, to the MeNB 200-1, the second measurement result for the DC special cell. Thus, the MeNB 200-1 is capable of knowing the details of the S-RLF.

In an operation pattern 1 of the fourth embodiment, when the UE 100 detects S-RLF in the DC special cell, the UE 100 transmits, to the MeNB 200-1, an S-RLF indication for notifying the S-RLF. The first measurement result and the second measurement result are included in the S-RLF indication.

In an operation pattern 2 of the fourth embodiment, when an event designated by the MeNB 200-1 occurs, the UE 100 transmits, to the MeNB 200-1, an event trigger type measurement report. The event indicates that S-RLF is detected in the DC special cell. The first measurement result and the second measurement result are included in the event trigger type measurement report.

According to such an operation pattern 1 or 2, the MeNB 200-1 is capable of knowing that S-RLF has occurred, and at the same time, is capable of knowing a radio condition of each cell of the SCG. It is possible to estimate the radio condition of the DC special cell through the S-RLF indication or the event trigger type measurement report. Thus, the second measurement result need not necessarily be included in the S-RLF indication or the event trigger type measurement report.

The communication control method according to the fourth embodiment is a method in the MeNB 200-1 that performs communication by the dual connectivity method along with the SeNB 200-2 that provides additional radio resources to the UE 100, and also establishes an RRC connection with the UE 100. The communication control method includes a step of receiving, from the UE 100, an S-RLF indication for notifying the S-RLF, and a first measurement result for a cell other than the DC special cell in the SCG, and a step of transmitting, to the SeNB 200-2, along with the first measurement result, a replacement request for requesting a replacement of the DC special cell upon receiving the S-RLF indication. This enables the SeNB 200-2 to appropriately determine whether or not it is possible to replace the DC special.

The MeNB 200-1 may further receive the second measurement result for the DC special cell from the UE 100. The MeNB 200-1 may transmit, to the SeNB 200-2, the replacement request, along with the first measurement result and the second measurement result. Here, the SeNB 200-2 may notice that the S-RLF is detected in the UE 100. Thus, by transmitting the second measurement result to the SeNB 200-2, the SeNB 200-2 is capable of appropriately estimating the occurrence of the S-RLF.

The communication control method according to the fourth embodiment is a method in the SeNB 200-2 that performs communication by the dual connectivity method along with the MeNB 200-1 that establishes an RRC connection with the UE 100, and also provides additional radio resources to the UE 100. The communication control method includes a step of receiving, from the MeNB 200-1, along with the first measurement result for a cell other than the DC special cell in the SCG, a replacement request for requesting a replacement of the DC special cell, a step of determining whether or not to replace the DC special cell with another cell on the basis of the first measurement result, upon receiving the replacement request, and a step of notifying the determination result to the MeNB 200-1. This enables the MeNB 200-1 to know whether or not the replacement of the DC special cell is possible in the SeNB 200-2.

The SeNB 200-2 may receive, from the MeNB 200-1, along with the first measurement result, the second measurement result for the DC special cell. The SeNB 200-2 may perform the determination on the basis of the first measurement result and the second measurement result.

When a new DC special cell is selected from another cell, the SeNB 200-2 notifies, to the MeNB 200-1, the new DC special cell. When a cell that is appropriate as a new DC special cell does not exist in another cell, the SeNB 200-2 notifies the release of the SCG to the MeNB 200-1.

(Operation Sequence According to Fourth Embodiment)

Hereinafter, an example of an operation sequence according to the fourth embodiment will be explained.

(1) Operation Pattern 1

Figure 15:
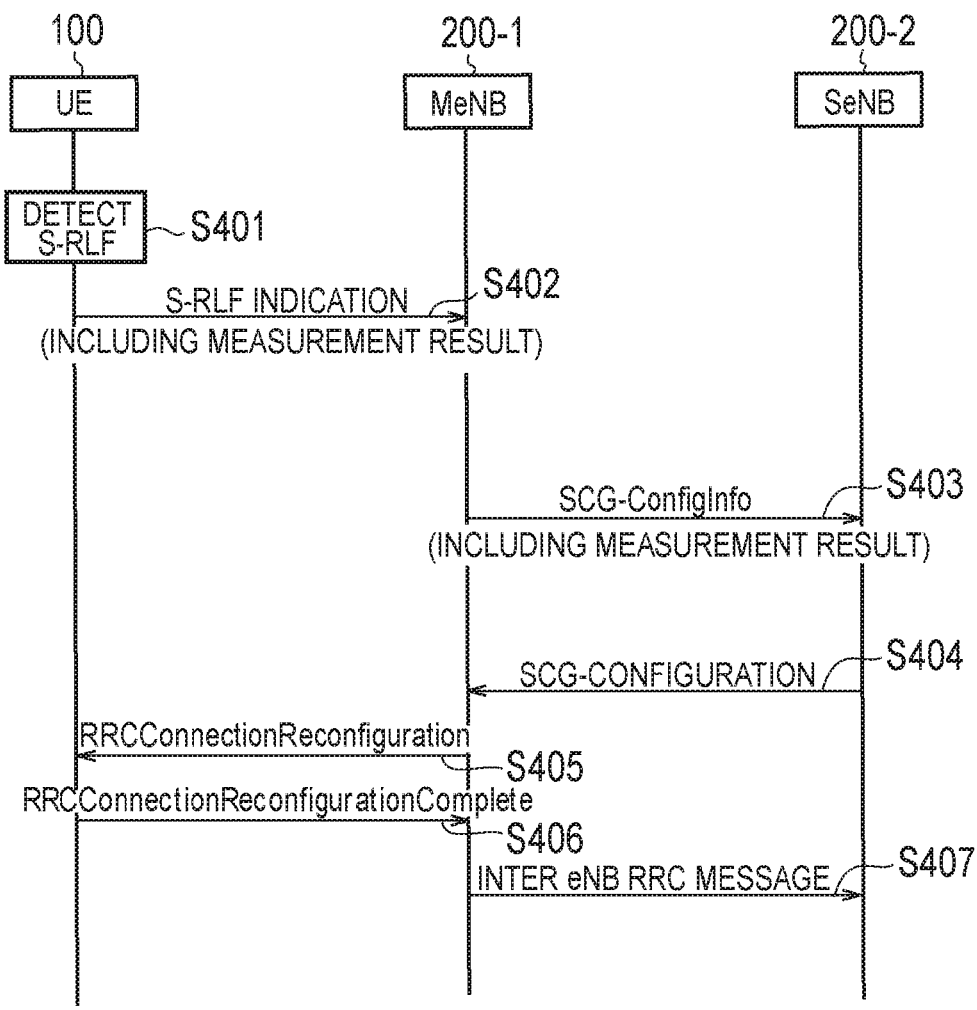
FIG. 15 is a sequence diagram showing an operation pattern 1 according to a fourth embodiment.

In the operation pattern 1 according to the fourth embodiment, the first measurement result and the second measurement result are included in the S-RLF indication. FIG. 15 is a sequence diagram showing the operation pattern 1 according to the fourth embodiment.

In the initial state of the present sequence, the communication by the dual connectivity method is performed. The UE 100 performs radio link monitoring (RLM) for the DC special cell. Moreover, the UE 100 performs measurement (RSRP measurement and RSRQ measurement) for each cell of the SCG on the basis of the measurement configuration (Measurement Config.) from the MeNB 200-1.

As shown in FIG. 15, in step S401, the UE 100 detects S-RLF. The UE 100 may stop the uplink transmission to the SCG upon detecting the S-RLF. Moreover, the UE 100 may stop the monitoring of the PDCCH for the SCG upon detecting the S-RLF.

In step S402, the UE 100 transmits, to the MeNB 200-1, an S-RLF indication for notifying the S-RLF. The UE 100 includes the measurement result for the SCG (the first measurement result and the second measurement result) in the S-RLF indication. Information indicating the type of the S-RLF may be further included in the S-RLF indication. Also, the UE 100 awaits an instruction from the MeNB 200-1 without resuming the connection with the SCG. The MeNB 200-1 receives, from the UE 100, the S-RLF indication including the first measurement result and the second measurement result.

In step S403, the MeNB 200-1 transmits, to the SeNB 200-2, a replacement request for requesting a replacement of the DC special cell upon receiving the S-RLF indication. Here, an example in which the replacement request is SCG-ConfigInfo, which is a new X2 message, or an information element thereof, is explained. The SCG-ConfigInfo includes the measurement result for the SCG (the first measurement result and the second measurement result).

The SeNB 200-2 receives, from the MeNB 200-1, the SCG-ConfigInfo (the replacement request) including the first measurement result and the second measurement result. The SeNB 200-2 determines whether or not to replace the DC special cell with another secondary cell upon receiving the SCG-ConfigInfo (the replacement request). For example, the SeNB 200-2 compares the first measurement result with a threshold value, and sets a cell corresponding to the first measurement result that is more favorable than the threshold value as a candidate of the new DC special cell. Alternatively, the SeNB 200-2 compares the first measurement result with the second measurement result, and sets a cell corresponding to the first measurement result that is more favorable than the second measurement result as a candidate of the new DC special cell. Also, from the candidates, the SeNB 200-2 selects a new DC special cell in consideration of the cell load status, etc. Moreover, when a candidate that is appropriate as a new DC special cell does not exist, the SeNB 200-2 may determine to release all secondary cells (SCGs).

In step S404, the SeNB 200-2 notifies the determination result of the SeNB 200-2 to the MeNB 200-1. Here, an example in which the notification is SCG-Configuration, which is a new X2 message, or an information element thereof, is explained. The MeNB 200-1 receives the SCG-Configuration (the determination result).

In step S405, the MeNB 200-1 transmits, to the UE 100, an RRC reconfiguration message (the RRCConnectionReconfiguration message) concerning an update of the SCG configuration on the basis of the SCG-Configuration (the determination result). The RRC reconfiguration message includes information designating the new DC special cell. Alternatively, the RRC reconfiguration message may include information designating the release of the SCG.

Upon receiving the RRC reconfiguration message, the UE 100 applies the RRC reconfiguration designated by the RRC reconfiguration message. However, when the UE 100 is not able to perform at least a part of RRC reconfiguration designated by the RRC reconfiguration message, the UE 100 may decide to deny the RRC reconfiguration. Here, the explanation is proceeded with assuming that the UE 100 is able to perform the RRC reconfiguration designated by the RRC reconfiguration message.

In step S406, the UE 100 transmits, to the MeNB 200-1, an RRC reconfiguration completion message (RRCConnectionReconfigurationComplete).

In step S407, the MeNB 200-1 transmits, to the SeNB 200-2, an acknowledgment message (Inter eNB RRC message) for the SCG-Configuration (the determination result).

(2) Operation Pattern 2

Figure 16:
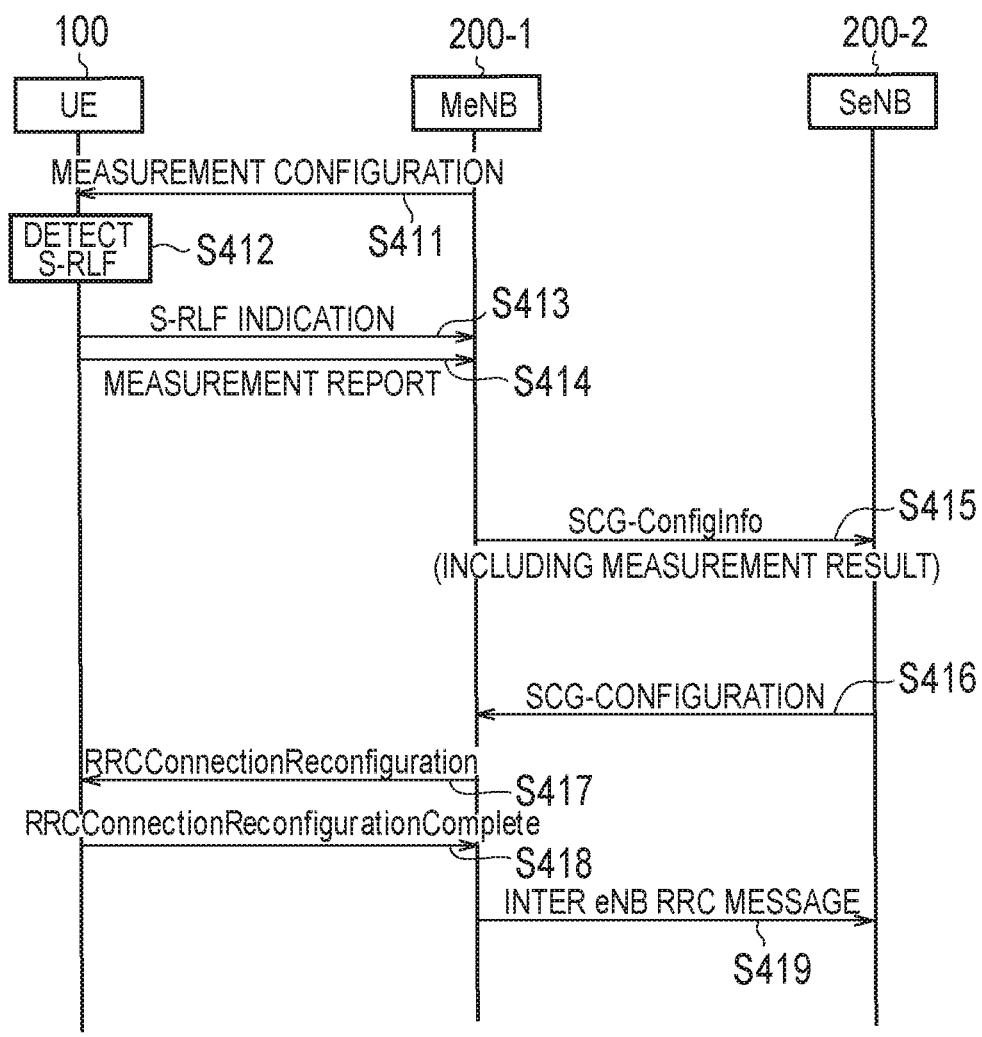
FIG. 16 is a sequence diagram showing an operation pattern 2 according to the fourth embodiment.

Next, an operation pattern 2 according to the fourth embodiment will be described while focusing on the differences from the operation pattern 1. In the operation pattern 2 according to the fourth embodiment, the first measurement result and the second measurement result are included in an event trigger type measurement report. FIG. 16 is a sequence diagram showing the operation pattern 2 according to the fourth embodiment.

In the initial state of the present sequence, the communication by the dual connectivity method is performed. The UE 100 performs radio link monitoring (RLM) for the DC special cell.

As shown in FIG. 16, in step S411, the MeNB 200-1 transmits, to the UE 100, a measurement configuration (Measurement Config.) for setting the event trigger type measurement report. The measurement configuration includes information for designating the event that acts as a trigger. The designated event is an event indicating that S-RLF is detected in the DC special cell. The UE 100 performs measurement (RSRP measurement and RSRQ measurement) for each cell in the SCG on the basis of the measurement configuration.

In step S412, the UE 100 detects S-RLF.

In step S413, the UE 100 transmits, to the MeNB 200-1, an S-RLF indication for notifying the S-RLF. Information indicating the type of the S-RLF may be included in the S-RLF indication.

Moreover, in step S414, upon the fulfillment of the designated event, the UE 100 transmits, to the MeNB 200-1, the event trigger type measurement report (Measurement Report). The UE 100 includes the measurement result for the SCG (the first measurement result and the second measurement result) in the measurement report. Step S413 and step S414 may be performed simultaneously. Also, the UE 100 awaits an instruction from the MeNB 200-1 without resuming the connection with the SCG. The MeNB 200-1 receives, from the UE 100, the S-RLF indication, and the measurement report including the first measurement result and the second measurement result.

In step S415, the MeNB 200-1 transmits, to the SeNB 200-2, a replacement request for requesting a replacement of the DC special cell upon receiving the S-RLF indication. Here, an example in which the replacement request is SCG-ConfigInfo, which is a new X2 message, or an information element thereof, is explained. The SCG-ConfigInfo includes the measurement result for the SCG (the first measurement result and the second measurement result).

The subsequent operations (steps S416 to S419) are the same as those in the operation pattern 1.

[Other Embodiments]

The aforementioned first embodiment to the fourth embodiment may be performed by combining at least two embodiments, rather than performing each embodiment separately and independently.

In the aforementioned second embodiment, mainly an example of selecting or reselecting a DC special cell on the basis of the measurement report was explained. However, the second embodiment obviously includes examples of selecting or reselecting an SCG composed of a plurality of cells including the DC special cell, on the basis of the measurement report. Moreover, the second embodiment obviously includes examples of selecting or reselecting an SCG cell other than the DC special cell, on the basis of the measurement report.

The above-described third embodiment is not limited to the dual connectivity method, and can be applied to a usual handover.

In the aforementioned fourth embodiment, an example in which when the UE 100 detects S-RLF, the UE 100 transmits, to the MeNB 200-1, the first measurement result for the cell other than the DC special cell in the SCG was explained. However, the first measurement result may further include the measurement result of a cell that is not included in SCG (a non-serving cell of the UE 100) from among the cells of the SeNB 200-2. That is, the first measurement result may be the measurement result for the cells having a frequency that is different from the frequency of the DC special cell.

Moreover, in the aforementioned fourth embodiment, an example in which the SeNB 200-2 selects a new DC special cell from the secondary cells included in the SCG upon receiving the SCG-ConfigInfo (the replacement request) was explained. However, the SeNB 200-2 may select a new DC special cell from cells of the SeNB 200-2 (a non-serving cell of the UE 100) that is not included in the SCG.

In the embodiment described above, although an LTE system is described as an example of a mobile communication system, it is not limited to the LTE system, and the present invention may be applied to a system other than the LTE system.

[Appendix 1]

(1) Introduction

According to the current agreements, upon the detection of S-RLF, the UE shall report the cause of the S-RLF to MeNB (RLM, RA or RLC failure) and suspend UL transmission and PDCCH monitoring on the SCG. Upon receiving the S-RLF report from the UE, the MeNB has the option to reconfigure the UE by releasing the SCG or by resuming the UE's operation with the same SCG. However it is unclear whether the MeNB can make the proper decision with only the cause of the S-RLF.

This contribution discusses whether UE should also include the latest measurement results in the S-RLF report.

(2) Discussion

During RAN2#85bis, the following agreements were reached:

1. UE shall perform radio link monitoring on the special SCell (S-RLM) for the purpose of detecting L1 out-of-sync. S-RLM specification should reuse the current RLM specification as much as possible.

1a. UE shall report S-RLF to MeNB (triggered by RLM, RA or RLC) and indicates which of the triggers were met.

1b. UE shall suspend UL transmissions to SCG upon S-RLF.

2. UE is not required to monitor the PDCCH for the SCG upon detecting S-RLF.

Figure 17:
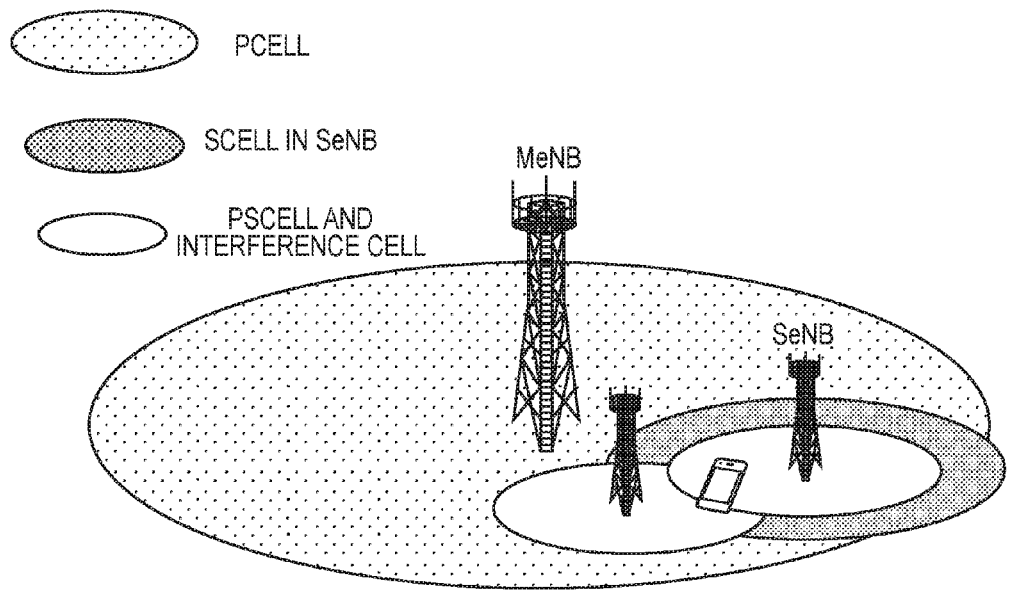
FIG. 17 is a diagram showing a case that a release of resources related to all cells included in SCG is not preferred.
Figure 18:
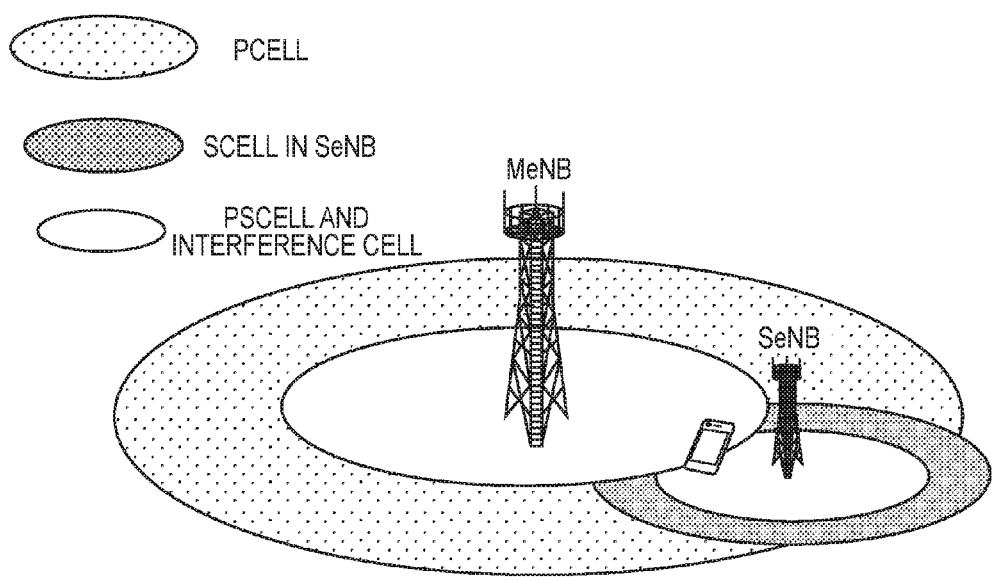
FIG. 18 is a diagram showing a case that a release of resources related to all cells included in SCG is not preferred.

It has been explained that in many cases when S-RLF occur the PSCell or even the SCG may need to be changed. And it would be simpler for the UE to have the same UE behaviour as the RLF for MCG by releasing all the resources associated with the SCG as opposed to the suspension of UL transmission and PDCCH monitoring when it detects S-RLF. However it isn't the best to release the resources associated with all cells in SCG in some cases, e.g. if only PSCell deteriorates and other SCells in SCG are still good enough. Examples of such scenarios are shown in FIGS. 17 and 18. FIG. 17 shows S-RLF in PSCell triggered by interference from a neighbour small cell on the same frequency layer while other cells in SCG remain unaffected. FIG. 18 S-RLF in PSCell triggered by interference from a MCG cell on the same frequency layer while other cells in SCG remain unaffected.

In both cases, S-RLF is detected by UE because of the interference although SCell(s) while other cells in SCG remain unaffected. MeNB has the option to reconfigure the UE to resume dual connectivity operation with the same SeNB. In order to avoid the unnecessary complexity to establish a new connection to the same SeNB, UE should not release the resources associated with the SCG when S-RLF is triggered.

Proposal 1: UE should not release the all resources associated with the SCG when S-RLF is triggered.

Assuming the UE remains suspended for UL transmission and PDCCH monitoring when S-RLF is triggered, once the MeNB is notified of the S-RLF condition, it should have the option to release or to resume the SCG for the UE. However, in order for the MeNB to decide whether to resume or release the SCG, it will need to know whether any of the cells in SCG can be a candidate for the PSCell. Simply knowing the cause of the S-RLF (i.e., RLF, RLM or RACH failure) doesn't provide the MeNB with sufficient information to make the proper decision. For the proper decision by MeNB, it should know the measurement results.

Proposal 2: MeNB should be provided with measurement results of serving cells in SCG upon S-RLF.

If Proposal 2 is agreeable, there are two potential alternatives for the MeNB to obtain the measurement results of the SCG.

1. Reusing on the existing measurement report mechanism which is based on the existing timeToTrigger criteria.

2. The latest measurements results from the SCG cells, as triggered by S-RLF, should be included as part of the contents in the S-RLF report.

With alternative 1, it is up to the MeNB to configure the UE with the appropriate measurements Events for SCG cells, and it is also up to the MeNB whether the measurement reports are also shared with the SeNB, to assist the SeNB in choosing the most appropriate PSCell so that S-RLF may be prevented as much as possible. Since the reporting of the measurements and events are based on timeToTrigger, the MeNB may not know the latest measurement results associated with the triggering of the S-RLF.

With alternative 2, the measurement reports of serving cells of SCG are included as part of the S-RLF report sent to the MeNB. It may be further discussed whether measurements from neighbour cells also need to be included. With this alternative the latest measurements corresponding to the cause of the S-RLF can be reported to the MeNB. This is also consistent with the existing RLF report for MCG which includes these types of measurements as part of VarRLF-Report.

Based on the above comparisons, alternative 2 would provide a greater benefit to the MeNB for making appropriate decisions.

Proposal 3: The latest measurement results from the SCG cells, as triggered by S-RLF, should be included in the S-RLF report.

According to current agreements, the MeNB is allowed to provide the latest measurement results of SCG cells when requesting the SeNB to add an SCell or establish SCG. In the case of S-RLF, it would be beneficial for the SeNB to obtain the latest measurement results esp. if the MeNB chooses to resume the UE's operation with the same SCG. However, this doesn't fall into the category of adding an SCell or establishing a new SCG; therefore, further clarification may be needed to allow the MeNB to provide the these S-RLF related measurements to the SeNB. Additionally it may be useful for the MeNB to inform the SeNB of the cause for the S-RLF in case the MeNB chooses to resume the UE's operation with the same SCG. In particular, it may be useful for the SeNB to know whether the cause of the S-RLF is due to RACH or RLM failure to assist the SeNB in choosing the most appropriate PSCell for the UE.

Proposal 4: If the MeNB chooses to resume the UE's operation with the same SCG upon S-RLF, the MeNB can provide the latest measurement reports and the cause of S-RLF to the SeNB.

(3) Conclusion

This contribution discusses the need for the UE to provide additional information to the MeNB upon S-RLF. It is suggested that the MeNB should be the entity to decide whether the SCG should be released or resumed for the UE. The latest measurement reports should be provided to the MeNB upon S-RLF in order to assist the MeNB in making the proper decision. In case the MeNB decides to resume the UE's operation with the same SCG, it would be helpful for the MeNB to provide the measurement reports along with the cause of the S-RLF to the SeNB.

[Appendix 2]

(1) Introduction

The cause values for dual connectivity may be borrowed from the existing cause values used for S1AP, e.g., handovers. However, the necessity of reusing the existing cause values and the possibility of additional cause values for dual connectivity required further discussion. In particular, the cause value "Radio Connection With UE Lost" should be further clarified. Based on the discussed proposal, this cause value seems to be only applicable for the SeNB release message and it is unclear whether the cause value is applicable for the MCG-RLF, SCG-RLF or both. Additionally, it should be further considered whether this cause value is also applicable for the MeNB initiated SeNB Modification preparation procedure in case the MeNB decides not to release the SeNB upon SCG-RLF. This contribution discusses how "Radio Connection With UE Lost" should be handled in X2AP.

(2) Discussion (SeNB Initiated SeNB Release)

"Radio Connection With UE Lost" is a cause value used for informing another eNB of radio link failure. SeNB may include this cause value in the SeNB initiated SeNB Release for informing MeNB of SCG-RLF. However it is questionable if this cause value is really needed since the UE sends SCGFailure report to the MeNB immediately after the SCG-RLF occurrence. Additionally, an agreement was reached that "There is no need to provide means for SeNB to notify failure of SCG serving cells to the MeNB". So, at least from RAN2's perspective, "Radio Connection With UE Lost" is not needed in SeNB initiated SeNB Release.

Observation 1: "Radio Connection With UE Lost" is not needed for the SeNB initiated SeNB Release procedure since the UE has already reported the SCG-RLF condition to the MeNB.

(MeNB Initiated SeNB Release)

MeNB may initiate SeNB Release if it recognizes radio link failure occurs. However there are two types of radio link failures, i.e. RLF for MCG and for SCG. SeNB may not understand which it is. Fundamental question here is if this cause value is needed for SeNB Release since this message cannot be rejected. Otherwise, if SeNB can utilize the cause value for e.g. parameter optimization, RAN3 should clarify the types of cause values. As a minimal expansion, new cause value like "SeNB Radio Connection With UE" can be introduced.

Proposal 1: RAN3 is kindly asked to discuss whether- "Radio Connection With UE Lost" is necessary for SeNB Release. If this cause is useful for SeNB, the RLF type should be clarified.

(MeNB Initiated SeNB Modification Preparation)

According to the current specification, the UE provides the SCGFailure report to the MeNB with up-to-date measurement result. The MeNB may use the reported measurement result to decide whether the SeNB should be released or modified. In addition to the measurement report, the SCGFailure report also includes details of the cause of the SCG-RLF, i.e., physical layer issue, random access failure or RLC failure. This information is also used by the MeNB to determine whether the SeNB should be released or modified. Clearly, there is no expectation that the MeNB will always release the SeNB; hence the need to provide measurement report for all SCG cells.

Of course, if the radio conditions of the reported measurements of the SCG cells are poor, MeNB may decide to release the SeNB using the MeNB initiated SeNB Release procedure. Regardless of the indicated cause value, SeNB cannot reject the SeNB Release request.

However, if one or more of the SCG cells are in good radio condition, the MeNB has the option to initiate SeNB Modification preparation for PSCell change since PSCell change can only be performed in SCG change procedure and the SCG change procedure is mapped to SeNB Modification.

Observation 2: MeNB may initiate SeNB Modification in order to change PSCell upon reception of SCGFailure report from the UE.

(Desired Action of SeNB)

Assuming the MeNB has decided not to release the SeNB upon the reception of the SCGFailure report from the UE, the MeNB may initiate the SeNB Modification preparation procedure which may include the request to add new SCG cells as a candidate for a new PSCell. However, unlike the case for the SeNB Release Request, the SeNB is allowed to reject the MeNB Initiated SeNB Modification preparation. Without the knowing the cause of such a modification request (i.e., due to SCG-RLF), the SeNB may reject the modification for the wrong reason which is undesirable.

Although it may be possible for the SeNB to detect the occurrence of SCG-RLF, the detection of this failure may not be immediate without feedback from the UE. This is precisely the reason why the SCGFailure report is sent immediately to the MeNB upon SCG-RLF. In turn, the SeNB should have the opportunity to receive the same indication of this failure without delay.

Furthermore, since it isn't necessary for the MeNB to inform the SeNB of MCG-RLF as part of the MeNB initiated SeNB Modification procedure, there is no ambiguity to reuse the cause value "Radio Connection With UE Lost" for this procedure as it can only be for the occurrence of SCG-RLF.

Proposal 2: The cause value "Radio Connection With UE Lost" should be included in the MeNB initiated SeNB Modification procedure when SCG-RLF occurs.

(3) Conclusion

This contribution addresses the need for clarification of the cause value "Radio Connection With UE Lost" used in SeNB Release Request; whether it should be applicable for the occurrence of MCG-RLF, SCG-RLF or both. In particular, the contribution provided reasons why the same cause value should also be reused for the MeNB Initiated SeNB Modification preparation procedure. We have the following observation and proposals.

It is noted that the entire content of Japan Patent Application No. 2014-017980 (filed on Jan. 31, 2014) and U.S. Provisional Patent Application No. 62/034,678 (filed on Aug. 7, 2014) are incorporated in the present application by reference.

INDUSTRIAL APPLICABILITY

As described above, according to the communication control method according to the embodiments, it is possible to appropriately perform the communication by the dual connectivity method, and it is useful in the mobile communication fields.

The invention claimed is:

1. A master base station that establishes an RRC connection with the user terminal and supports communication by dual connectivity method with a secondary base station that provides an additional radio resource to a user terminal, comprising:
   a receiver that receives a failure notification from the user terminal, the failure notification notifying of a radio link failure in a special cell of the secondary base station and including a measurement report, the measurement report including an indication measurement of an RSRP (Reference Signal Received Power) or an RSRQ (Reference Signal Received Quality) obtained for one or more cells of the secondary base station by the user terminal and used for an RRC reconfiguration of the user terminal, the special cell being a cell provided with a Physical Uplink Control Channel of the user terminal;
   a first transmitter that transmits an RRC reconfiguration message to the user terminal, the RRC reconfiguration message being a message for performing the RRC reconfiguration of the user terminal; and
   a second transmitter that transmits an RRC reconfiguration notification to the secondary base station, the RRC reconfiguration notification notified in relationship with the RRC reconfiguration message, wherein
   the second transmitter transmits the received measurement report included in the failure notification and including the RSRP or the RSRQ to the secondary base station.

2. The master base station according to claim 1, wherein the RRC reconfiguration notification includes a content of the RRC reconfiguration.

3. The master base station according to claim 1, wherein the second transmitter transmits the RRC reconfiguration notification before the transmission of the RRC reconfiguration message.

4. The master base station according to claim 1, wherein a transmission from the secondary base station to the user terminal is stopped based on the RRC reconfiguration notification.

5. The master base station according to claim 4, wherein the transmission from the secondary base station to the user terminal is stopped, from a time of receiving the RRC reconfiguration notification until a lapse of a predetermined time, and the predetermined time corresponds to a time from when the user terminal receives the RRC reconfiguration message until when the RRC reconfiguration message is reflected, the transmission from the secondary base station to the user terminal is resumed after the lapse of the predetermined time.

6. The master base station according to claim 4, wherein the transmission stopped by the secondary base station is a transmission on a user dedicated channel.

7. A communication control method that controls communication by dual connectivity method using a master base station that establishes an RRC connection with a user terminal and a secondary base station that provides an additional radio resource to the user terminal, the communication control method comprising steps of:

(a) receiving, at the master base station, a failure notification from the user terminal, the failure notification notifying of a radio link failure in a special cell of the secondary base station and including a measurement report, the measurement report including an indication measurement of an RSRP (Reference Signal Received Power) or an RSRQ (Reference Signal Received Quality) obtained for one or more cells of the secondary base station by the user terminal and used for an RRC reconfiguration of the user terminal, the special cell being a cell provided with a Physical Uplink Control Channel of the user terminal;

(b) transmitting the received measurement report included in the failure notification and including the RSRP or the RSRQ to the secondary base station;

(c) transmitting an RRC reconfiguration message from the master base station to the user terminal, the RRC reconfiguration message is a message for performing the RRC reconfiguration of the user terminal; and (d) transmitting an RRC reconfiguration notification from the master base station to the secondary base station, the RRC reconfiguration notification notified in relationship with the RRC reconfiguration message.

8. The master base station according to claim 1, wherein the measurement report including the measurement result obtained for one or more cells of the secondary base station including a neighbor cell of the special cell by the user terminal.

9. The master base station according to claim 1, wherein the measurement report including the measurement result including an indication of measurement of the signal power or signal quality obtained for one or more cells of the secondary base station.

* * * * *